United States Patent
Wise et al.

(10) Patent No.: US 12,061,568 B2
(45) Date of Patent: Aug. 13, 2024

(54) TWO-WIRE HOST INTERFACE

(71) Applicant: IDEX BIOMETRICS ASA, Oslo (NO)

(72) Inventors: Adrian Wise, Bracknell (GB); Keith Ahluwalia, Wiltshire (GB)

(73) Assignee: IDEX Biometrics ASA, Oslo (NO)

( * ) Notice: Subject to any disclaimer, the term of this patent is extended or adjusted under 35 U.S.C. 154(b) by 232 days.

(21) Appl. No.: 17/639,417

(22) PCT Filed: Sep. 11, 2020

(86) PCT No.: PCT/EP2020/075474
§ 371 (c)(1),
(2) Date: Mar. 1, 2022

(87) PCT Pub. No.: WO2021/048356
PCT Pub. Date: Mar. 18, 2021

(65) Prior Publication Data
US 2022/0327091 A1    Oct. 13, 2022

(30) Foreign Application Priority Data
Sep. 11, 2019    (GB) ..................................... 1913126

(51) Int. Cl.
*G06F 13/42* (2006.01)
*G06F 1/3206* (2019.01)
*G06F 13/40* (2006.01)

(52) U.S. Cl.
CPC ........ *G06F 13/4286* (2013.01); *G06F 1/3206* (2013.01); *G06F 13/4068* (2013.01); *G06F 13/4291* (2013.01)

(58) Field of Classification Search
CPC ............... G06F 1/3206; G06F 13/4068; G06F 13/4286; G06F 13/4291; G06F 13/42; G06F 13/4282; H04L 12/40078
See application file for complete search history.

(56) References Cited

U.S. PATENT DOCUMENTS 5,852,406 A * 12/1998 Edde ................... G06F 13/4291
370/395.5
6,073,186 A * 6/2000 Murray ............... G06F 13/4295
710/60

(Continued)

OTHER PUBLICATIONS

International Search Report and Written Opinion—PCT/EP2020/075474—ISA/EPO—Nov. 20, 2020.

(Continued)

*Primary Examiner* — Thomas J. Cleary
(74) *Attorney, Agent, or Firm* — Smith Tempel Blaha LLC; Michael J. Tempel

(57) ABSTRACT

A two-wire interface (300) for connecting a first device (106) and a second device (108). The two-wire interface (300) is operable in a handshaking mode and a data transfer mode. In the handshaking mode the first wire (302) of the interface (300) is driven by the first device (106) and the second wire (304) of the interface (300) is driven by the second device (108) so that the first (106) and second (108) devices can perform a handshaking sequence. In the data transfer mode one of the first wire (302) and the second wire (304) is driven by one of the first (106) and second (108) devices to provide a clock signal, and the other wire is driven by either the first device (106) or the second device (108) depending which device is transmitting data. Accordingly, the two-wire interfaces (300) are operable in two modes (e.g. handshaking mode and data transfer mode) and one of the wires (302, 304) of the interface (300) may be driven by a different device in the two modes.

27 Claims, 20 Drawing Sheets

(56) References Cited

U.S. PATENT DOCUMENTS

| | | | |
|---|---|---|---|
| 6,865,186 B1* | 3/2005 | Jackson | G11C 7/16 |
| | | | 370/537 |
| 10,430,225 B1* | 10/2019 | Harland | G06F 9/45558 |
| 11,687,482 B2* | 6/2023 | Eaton | G06K 19/0723 |
| | | | 710/313 |
| 2008/0181315 A1* | 7/2008 | Wang | H04L 25/0272 |
| | | | 375/295 |
| 2010/0131681 A1* | 5/2010 | Reddy | G06F 13/126 |
| | | | 710/36 |
| 2014/0297898 A1* | 10/2014 | Parten | G06F 3/023 |
| | | | 710/316 |
| 2016/0170932 A1 | 6/2016 | Lin | |
| 2016/0259005 A1 | 9/2016 | Menon et al. | |
| 2018/0357194 A1* | 12/2018 | Ulmer | G06F 13/3625 |
| 2019/0236321 A1 | 8/2019 | Poon et al. | |
| 2023/0259483 A1* | 8/2023 | Eaton | G06F 13/4282 |
| | | | 710/313 |

OTHER PUBLICATIONS

GB1913126.7_Examination_Report_Jan. 11, 2023.
CN_Jan. 27, 2024_Office_Action.

* cited by examiner

TWO-WIRE HOST INTERFACE

BACKGROUND

A smart card may refer to a device that includes an embedded integrated circuit chip and internal memory. That internal memory may be located on the integrated circuit chip, or be a separate chip embedded within the card. A smart card may be a contact card; a contactless card, or may be capable of operating as a contact and contactless card. Some types of smart cards may contain an on-card power source, such as a battery or solar cell. Smart cards exist in a wide variety of form factors, including plastic cards, key fobs, watches, wearables, electronic passports and USB-based tokens, and subscriber identification modules (SIMs) used in mobile phones.

A contact card can receive power from, and communicate with, a terminal (e.g. a card reader) by physically connecting to the terminal. For example, a contact card may comprise one or more contact pads or elements that provide electrical connectivity to the terminal when the card and terminal are brought into suitable physical contact (e.g. by inserting the card into a slot within a terminal).

A contactless card can receive power from, and communicate with, a terminal without direct physical contact between the terminal and the card. Typically, a contactless card communicates with a terminal via radio waves. The contactless card may include an antenna to receive an electromagnetic signal, such as a radio frequency (RF) signal, emitted from a terminal. Likewise, data from the card can be communicated back to the terminal by means of the card's antenna.

Some contactless cards are 'passive'. A passive card powers the embedded chip from energy harvested from the signal emitted by the terminal. One way to harvest energy from the emitted signal is to arrange the antenna as a coil that induces a voltage across its terminals by means of induction when receiving the emitted signal.

Smart card technology is being implemented within a variety of devices used to perform increasingly varied functions, for example to perform payments, grant a user physical access to a region of an environment, to store personal identification information of the user, identify or authenticate a user, etc.

Smart cards are increasingly incorporating additional components to increase security and/or to improve the user's experience of using the smart card. For example, biometric sensors, such as fingerprint sensors, are being incorporated into smart cards in order to provide user identity verification or authentication. Likewise, some smart cards feature a display screen which may be used for a variety of purposes, e.g. to display information associated with the card account or the card holder, to provide information during use of the card (e.g. transaction status, transaction amount, instructions to the user) and for decoration and branding (e.g. to highlight a logo, to personalise the card, etc.) A common use for a display screen on a bank card is to display the card verification value (CVV), or a dynamic CVV (dCVV) (i.e. a CVV that periodically changes).

Where a smart card comprises one or more of these additional components it may be desirable for the embedded circuit chip to be able communicate with the additional component(s). This may be particularly true if the functions performed by the embedded integrated circuit chip and the additional module(s) are coupled. For example, where a smart card comprises a biometric module comprising a biometric sensor for verifying the identity of the user of the smart card, the embedded integrated circuit chip may only perform a first function (e.g. perform a payment) if the user has been authenticated by the biometric module. In this example, the embedded integrated circuit chip and the biometric module may exchange biometric communications.

Communication between the embedded circuit chip and an additional component (e.g. biometric module) may be enabled by a physical interface between the embedded integrated circuit chip and the additional component. The physical interface may be implemented by a set of conductors or wires between the embedded integrated circuit chip and the additional component, and the chip and the additional component may be configured to communicate over the conductors or wires according to a communication protocol. Such interfaces have generally been implemented using at least three wires. Examples of such interfaces include a 4-wire SPI (Serial Peripheral Interface) or a 4-wire interface that uses two wires to implement an I2C (inter IC) interface and two wires for handshaking.

However, in many cases the smart card is manufactured separately from the additional component (e.g. biometric module) and the additional component is only inserted in the smart card after manufacture. Specifically, in some cases, to allow the additional component (e.g. biometric module) to be added to the smart cart card after manufacture, the smart card may be manufactured with a cut-out (or similar) in which the additional component can be inserted that comprises an exposed contact plate or pad connected to each conductor or wire of the interface. The additional component (e.g. biometric module) is then electrically connected (e.g. via wires, corresponding contact plates etc) and inserted (e.g. bonded via conductive adhesive) into the cut-out. However, generally the higher the number of wires in the interface the more complex the smart card and the more expensive the smart card is to manufacture. Furthermore, the higher the number of wires in the interface the smaller the contact plates or pads; and the smaller the contact plates or pads, the more difficult it is to make secure and reliable connections between the contact plates or pads and the corresponding additional module (e.g. biometric module). Accordingly, there is a desire for an interface, and associated communication protocol that operates over that interface, that has a reduced number of conductors or wires.

The embodiments described below are provided by way of example only and are not limiting of implementations which solve any or all of the disadvantages of known smart cards.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein is a two-wire interface for connecting two devices. Specifically, described herein is a two-wire interface connecting a first device and a second device wherein the interface is operable in a handshaking mode and a data transfer mode. In the handshaking mode the first wire of the interface is driven by the first device and the second wire of the interface is driven by the second device so that the first and second devices can perform a handshaking sequence. In the data transfer mode one of the first wire and the second wire is driven by one of the first and second devices to provide a clock signal, and the other wire is driven by either the first device or the second device depending which device is transmitting data. Accordingly, the two-wire interfaces described herein are operable in two modes (e.g. handshaking mode and data transfer mode) and one of the wires of the interface may be driven by a different device in the two modes.

A first aspect provides a system comprising: a first device; a second device; and a two-wire interface connecting the first device to the second device; wherein the interface is operable in a handshaking mode and a data transfer mode, such that, in the handshaking mode a first wire of the interface is driven by the first device and a second wire of the interface is driven by the second device, and in the data transfer mode one of the first wire and the second wire is driven by one of the first device and the second device to provide a clock signal and the other wire is driven by either the first device or the second device to transmit data depending on which of the first device and the second device is transmitting data.

The first device may be configured to control the second device through command-response based operation.

During a command-response sequence between the first device and the second device the first and second devices may be configured to transition between operating the interface in handshaking mode and operating the interface in data transfer mode and/or to transition between operating the interface in handshaking mode and operating the interface in data transfer mode, at least once.

A transition from operating the interface in handshaking mode to operating the interface in data transfer mode is triggered may the completion of a handshaking sequence.

The first device and the second device may be configured to operate the interface in data transfer mode only after a handshake-to-data threshold amount of time has elapsed after the completion of the handshaking sequence.

When the transition from operating the interface in handshaking mode to operating the interface in data transfer mode causes a different device to drive one of the first wire and the second wire, the device driving the one of the first wire and the second wire in the handshaking mode may be configured to cease driving the one of the first wire and the second wire after a handshake-to-undriven threshold amount of time has expired after the completion of the handshaking sequence.

The handshake-to-undriven threshold may be less than the handshake-to data threshold such that the one of the first wire and the second wire is not driven by the first device or the second device for a period of time after completion of the handshaking sequence.

A transition from operating the interface in data transfer mode to operating the interface in handshaking mode may be triggered by the completion of a data transfer.

The first device and the second device may be configured to operate the interface in handshaking mode only after a data-to-handshake threshold amount of time has elapsed after the completion of the data transfer.

When the transition from operating the interface in data transfer mode to operating the interface in handshaking mode causes a different device to drive one of the first wire and the second wire, the device driving the one of the first wire and the second wire in the data transfer mode may be configured to cease driving the one of the first wire and the second wire after a data-to-undriven threshold amount of time has expired after the completion of the data transfer.

The data-to-undriven threshold is less than the data-to-handshake threshold such that the one of the first wire and the second wire is not driven by the first device or the second device for a period of time after completion of the data transfer.

When the first and second devices are operating the interface in handshaking mode the first device may be configured to initiate a command-response sequence by initiating a first handshaking sequence on the first wire, and upon completion of the first handshaking sequence, the first and second devices are configured to transition to operating the interface in the data transfer mode wherein the first device drives the second wire.

The first handshaking sequence may comprise: the first device driving a state of the first wire from a first state to a second state; the second device, in response to detecting that the first wire is in the second state, driving the second wire from the first state to the second state; the first device, in response to detecting that the second wire is in the second state, driving the first wire from the second state to the first state; and the second device, in response to detecting that the first wire is in the first state, driving the second wire from the second state to the first state.

The second device may be operable in a low power mode and a normal operating mode and initiating the first handshaking sequence causes the second device to transition from the low power mode to the normal operating mode.

The first and second devices may be configured to, after each data transfer, transition from operating the interface in data transfer mode to operating the interface in handshaking mode.

When the interface is operating in data transfer mode the first wire may be driven by the first device to provide the clock signal.

When the interface is operating in data transfer mode, the first device and the second device may be configured to perform an SPI data transfer.

The first device may be a master device and the second device may be a slave device.

When the interface is operating in data transfer mode, the second wire is driven by the second device to provide the clock signal.

When the interface is operating in data transfer mode the first device and the second device may be configured to perform a UART data transfer.

The interface may be further operable in an external communication mode in which the first device uses the interface to communicate with another device; and the system may be operable in a first mode and a second mode and when the system is operating in the first mode, the interface is operable in the external communication mode and the data transfer mode and when the system is operating in the second mode, the interface is operable in the handshaking mode and the data transfer mode.

When the interface is operating in the external communication mode the first device may be configured to communicate with the other device in accordance with ISO 7816.

When the system is operating in the first mode and the interface is operating in the external communication mode, the second device may be configured to monitor the wire used to transmit data for a predetermined data pattern, and in response to detecting the predetermined data pattern, transition from operating the interface in the external communication mode to operating the interface in the data transfer mode.

When the interface is operating in the external communication mode the first device may communicate with the other device using a communication protocol and the predetermined data pattern may be benign in the communication protocol.

The communication protocol may be ISO 7816 T=0 and the predetermined data pattern may comprise two NULL procedure bytes within a predetermined time of each other.

The communication protocol may be ISO 7816 T=1 and the predetermined data pattern may be a badly formed S-block to which the other device is configured to respond with an R-block.

The second device may be configured to transition the interface from operating in the external communication mode to operating in the data transfer mode by isolating the other device from the wire of the interface used to transmit data to establish a private channel between the first device and the second device.

When the interface is operating in the external communication mode the wire used for the clock signal is driven with a clock signal generated from an external clock, and the second device may be further configured to transition the interface from operating in the external communication mode to operating in the data transfer mode by driving the wire used for the clock signal with a clock signal generated from an internal clock.

Subsequent to the private channel being established, the second device may be configured to notify the first device of a frequency of the clock signal generated from the internal clock.

When the system is operating in the second mode and the interface is operating in the data transfer mode, the second device may be configured to, in response to detecting a specific pattern on the wire used to transmit data, transition the interface to operating in the external communication mode.

The second device may be configured to transition the interface to operating in the external communication mode by re-connecting the other device to the wire of the interface used to transmit data.

The second device may be configured to transition the interface to operating in the external communication mode by driving the wire used for the clock signal with the clock signal generated from the external clock.

When the system is operating in the first mode the first device may be in contactless communication with the other device and when the system is operating in the second mode the first device may be in contact communication with the other device.

The first device may be a chip configured to communicate with a terminal.

The chip may be a secure element.

The second device may be a biometric sensor module comprising a biometric sensor for sensing biometric data.

A second aspect provides device comprising the system of the first aspect.

The device may be a smart card.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
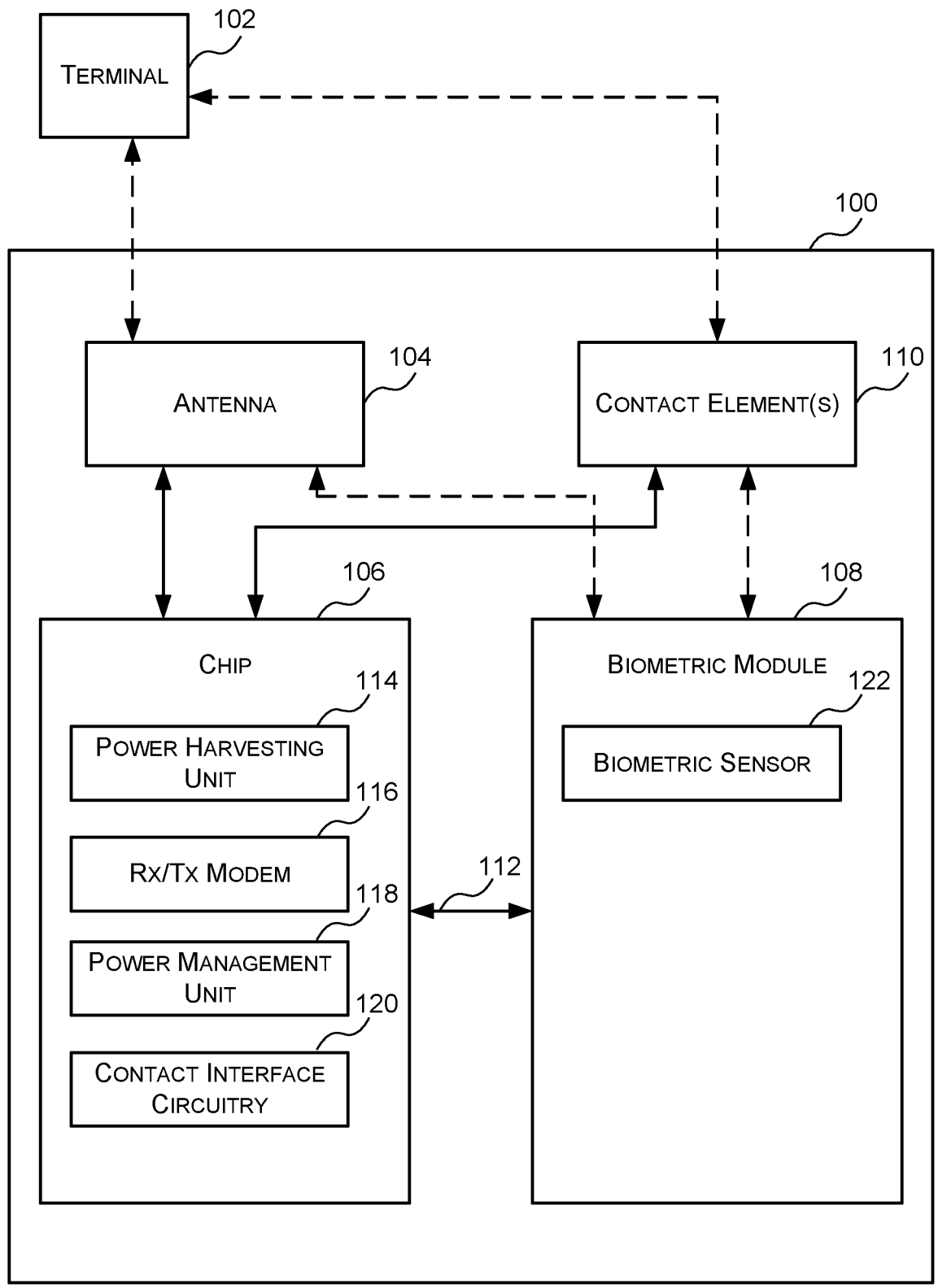
FIG. 1 is a block diagram of a first example device capable of contactless or contact communication with a terminal wherein the device comprises a chip and a biometric module connected by an interface.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, the high number of wires in the known interfaces between an embedded integrated circuit chip of a smart card and another component of the smart card (e.g. biometric module) increases the cost and complexity of the smart cards, and results in small contact pads that make it difficult to make secure and reliable connections between the contact pads and the other component (e.g. biometric module). Accordingly, there is a desire for an interface, and associated communication protocol that operates over that interface, that has a smaller number of conductors or wires.

Accordingly described herein are two-wire interfaces, and associated communications protocols, for connecting two devices. Specifically, described herein are two-wire interfaces for connecting a first device and a second device wherein the interface is operable in a handshaking mode and a data transfer mode. In the handshaking mode the first wire of the interface is driven by the first device and the second wire of the interface is driven by the second device so that the first and second devices can perform a handshaking sequence. In the data transfer mode one of the first wire and the second wire is driven by one of the first and second devices to provide a clock signal, and the other wire is driven by either the first device or the second device depending on which device is transmitting data.

For example, in the data transfer mode the first wire may be driven by the first device to provide a clock signal and the second wire may be driven by either the first device or the second device depending on which device is transmitting data (e.g. the second wire may be driven by the first device when the first device is transmitting data, and the second wire may be driven by the second device when the second device is transmitting data). In another example, in the data transfer mode the second wire may be driven by the second device to provide a clock signal and the first wire may be driven by either the first device or the second device depending on which device is transmitting data. Accordingly, in the data transfer mode the data wire is half-duplex, that is, either the first device or the second device can transmit data over the data wire, but they both cannot be transmitting at the same time.

The function of the clock signal in the data transfer mode may vary depending on the communication protocol used to perform the data transfer. Specifically, when the data transfer is performed in accordance with a synchronous communication protocol, such as the SPI protocol, the clock signal may be used to trigger the output of data on the data wire by the transmitter and sampling of the data wire by the receiver. For example, in the SPI protocol, the rising edge (or the falling edge) of the clock signal triggers the output of data and the sampling of input data. In contrast, when the data transfer is performed in accordance with an asynchronous communication protocol, such as the ISO 7816 UART protocol, the clock signal may have a different purpose. For example, in ISO 7816 UART the clock signal is merely a common reference clock used to derive the baud rate clock for the serial input/output (I/O) between the transmitter and receiver.

Accordingly, the two-wire interfaces described herein are operable in two modes (e.g. handshaking mode and data transfer mode) and one of the wires of the interface may be driven by a different device in the two modes. In other words, one of the wires may change direction in the two modes. For example, one of the wires may change from being an input to the first device and the output of the second device in one mode (e.g. handshaking mode), to being an output of the first device and an input of the second device in the other mode (e.g. data transfer mode).

The handshaking mode may allow the first and/or second device to operate in a low power mode when that device is not needed. For example, where the first device controls the operation of the second device through command-response based operation, the second device may operate in a low power mode until the first device wants the second device to execute a command (e.g. perform biometric authentication). In these cases, the first device may let the second device know that it is needed via a handshaking sequence. The detection of the handshaking sequence may cause the second device to wake from its low power mode to a normal operating mode. Similarly, the first device may enter a low power mode while the second device is executing the command issued by the first device. In these cases, the second device may notify the first device that it has completed execution of the command via a handshaking sequence. The detection of the handshaking sequence by the first device may cause the first device to wake from its low power mode to a normal operating mode. This is particularly useful, when, for example, as described in more detail below, the first and second devices form part of a smart card that is operating in contactless mode with a terminal such that the power received wirelessly from the terminal is limited.

The handshaking mode may, depending on the communication protocol used for the data transfer, also, or alternatively, allow the single data wire to be used to transmit data from the first device to the second device, and, to transmit data from the second device to the first device. Specifically, where the communication protocol is one, such as the SPI protocol, where each device typically has its own dedicated wire for data transmission—i.e. a wire for transmitting data from the first device to the second device and a separate wire for transmitting data from the second device to the first device—such that there may be electrical contention for the single data wire, the handshaking mode may be used to signal or indicate when the data wire is to be driven by a different device. This may not be an issue in other communication protocols, such as ISO 7816 UART, where there is no contention concerning which device drives the data wire.

The handshaking mode may also, or alternatively, be used to notify the transmitter of data that the receiver is unequivocally ready to receive the data before it is sent. This may be particularly important where the devices can be in a low power state and are woken up from a low power state before data is transmitted thereto. This is because the time to completely awaken a device from a low power mode may vary, and even once awake and operating in the normal operating mode the device may be running slowly if the amount of power available is low. Accordingly, without using handshaking signals to verify that the receiver is ready to receive data there is a risk that some of the data could be dropped because the receiver was not ready.

In the examples described below the two-wire interface is used for communication between an embedded integrated circuit chip and a biometric module of a device (e.g. smart card) capable of communicating with a terminal (e.g. card reader). However, the embedded integrated circuit chip and the biometric module are only example first and second devices which can communicate using the described two-wire interfaces and it will be evident to a person of skill in the art that the two-wire interfaces described herein may be used for communication between any two devices.

Reference is now made to FIG. 1 which illustrates an example device 100 capable of communicating with a terminal 102 via a contact or contactless interface to perform a first function.

The device 100 and the terminal 102 may take one of many form factors. The device 100 may be, for example, a smart card, an ID card, a passport, a fob, a dongle, a security token (e.g. a USB token) etc. Alternatively, the device 100 may be integrated in a communication device such as a mobile phone or smartphone; a wearable device, such as a bracelet, watch, a glove/pair of gloves, a pin (e.g. a brooch), a badge or some other contactless wearable device. The terminal 102 may be, for example, a card reader, such as a point-of-sale (POS) terminal, a cash register, an ATM machine, a computer, a smartphone etc. In some examples, the device may be a proximity integrated circuit card (PICC) and the terminal may be a proximity coupling device (PCD).

The device 100 comprises an antenna 104, a chip 106, a biometric module 108 and one or more contact elements 110. The chip 106 is embedded within the device 100 and may be, for example, a Secure Element. The biometric module 108 may also be embedded within the device 100. In this example the biometric module 108 is a physically distinct component from the chip 106. Each of the chip 106 and the biometric module 108 may be implemented on respective integrated circuit chips embedded in the device 100. The biometric module 108 and chip 106 are connected to each other by a two-wire interface, shown generally at 112. Example implementations of the two-wire interface are described below.

The device 100 communicates with the terminal 102 (e.g. transmits message to and/or receives messages from the terminal) through the antenna 104 when the device 100 is operating in contactless mode, and through the contact element(s) 110 when operating in contact mode. Although a single contact element 110 is shown in FIG. 1 in other examples there may be a plurality of contact elements.

The contact element(s) 110 is/are connected to the chip 106 by any suitable means, such as, but not limited to, one or more conductive links or elements. The contact element(s) 110 allow the device 100 to communicate with, and receive power from, the terminal 102 when the contact element(s) 110 are in suitable physical contact with corresponding elements of the terminal 102. Accordingly, when the device 100 is operating in contact mode the chip 106 receives power from the terminal 102 via the contact element(s) 110. In some cases, the device 100 may communicate with the terminal 102 in accordance with the ISO 7816 standard when operating in contact mode.

In the example shown in FIG. 1 the contact element(s) 110 are also connected to the biometric module 108 so that the biometric module 108 can also receive power from the contact element(s) 110. However, in other examples, the contact element(s) 110 may only be connected to the chip 106 such that the chip 106 receives power from the terminal 102 when operating in contact mode and manages the received power to power its internal components and supply power to the biometric module 108.

Similarly, the antenna 104 is connected to the chip 106 by any suitable means, such as, but not limited to, one or more conductive links or elements. The antenna 104 allows the device 100 to wirelessly communicate with, and harvest power from, the terminal 102 when the device 100 is within suitable proximity, or range, of the terminal 102. Specifically, the chip 106 comprises a power harvesting unit 114, a transceiver modem 116, a power management unit 118 and contact interface circuitry 120. In some cases the antenna 104 may also be connected to the biometric module 108 by, for example, physical links, such as, but not limited to conductive links or elements. In these cases, the biometric module 108 comprises its own power harvesting unit to harvest power from the received wireless signal. However, in other cases, the antenna 104 may only be connected to the chip 106 and the chip 106 may be configured to distribute the power harvested from the received wireless signal to the chip 106 and the biometric module 108.

The power harvesting unit 114 is configured to harvest power from a wireless signal emitted by the terminal 102 which is received by the antenna 104 when the device 100 is operating in contactless mode. The power harvesting unit 114 may, for example, induce a voltage from the received signal emitted by the terminal 102. That induced voltage can be supplied to other components of the chip 106 and the biometric module 108. The wireless signal emitted from the terminal 102 may be a radio frequency (RF) signal governed by a radio communications standard. In one example, the wireless signal may be a Near Field Communication (NFC) signal.

The transceiver modem 116 is configured to manage the transmission of messages to, and reception of messages from, the terminal 102 when the device 100 is operating in contactless mode. Specifically, the terminal 102 may be configured to transfer data to the device 100 by modulating (e.g. amplitude modulating) a carrier signal with the data it wishes to transfer. In these cases, the modem 116 may be configured to extract the data from the received wireless signal by demodulating (e.g. demodulating the amplitude of) the received signal.

Similarly, the modem 116 may be configured to transfer messages to the terminal by modulating data generated by the chip 106 onto the wireless signal emitted from the terminal. In some cases, the modem 116 may be configured to modulate the received signal by applying a modulated load to the antenna 104. Modulating the antenna load at the device varies the power drawn from the received signal in accordance with the modulation. The variations in the drawn power can be detected by the terminal 102 and interpreted as data.

The power management unit (PMU) 118 is configured to manage, or control, the use of power (either harvested by the power harvesting unit 114 in contactless mode or supplied through the contact element(s) 110 in contact mode) by the chip 106. The PMU 118 may control the power consumed by the other components of the chip 106 to perform their tasks. In cases in which the biometric module 108 is not connected to the antenna 104 or contact element(s) 110, the PMU may also control the supply of power received from, or harvested from, the terminal 102 to the biometric module 108.

The chip 106 further comprises a contact interface circuitry 120 that manages the transmission of messages to, and the receipt of messages from, the terminal 102 when operating in contact mode. The contact interface circuitry 120 may be configured to ensure the communications between the chip 106 and terminal 102 satisfy any relevant standards (e.g. the ISO 7816 standard) when the device 100 is operating in contact mode.

The biometric module 108 is configured to perform biometric authentication of a user based on biometric data of a user. Specifically, the biometric module 108 comprises a biometric sensor 122. The biometric sensor 122 is configured to capture biometric data of a user which can be used to biometrically identify or authenticate the user. The biometric authentication based on the biometric data obtained from the biometric sensor 122 may be performed by the biometric module 108 and/or the chip 106. Example biometric identifications that may be performed by the biometric module 108 and/or the chip 106 include, but are not limited to: fingerprint recognition; iris recognition; vein recognition; retina recognition; voice recognition; behavioural recognition; facial recognition etc. In some cases, the biometric authentication may be performed as part of or in conjunction with the first function performed by the chip 106. For example, in some cases the biometric authentication may be performed by the biometric module 108 in response to a request to perform biometric authentication from the chip 106.

It will be evident to a person of skill in the art that this is only an example of a device that can communicate with a terminal and in other examples the device may not comprise the contact element(s) and contact interface circuitry such that the device is only able to operate in contactless mode or the device may not comprise the antenna, power harvesting unit and transceiver modem such that the device is only able to operate in contact mode.

Figure 2:
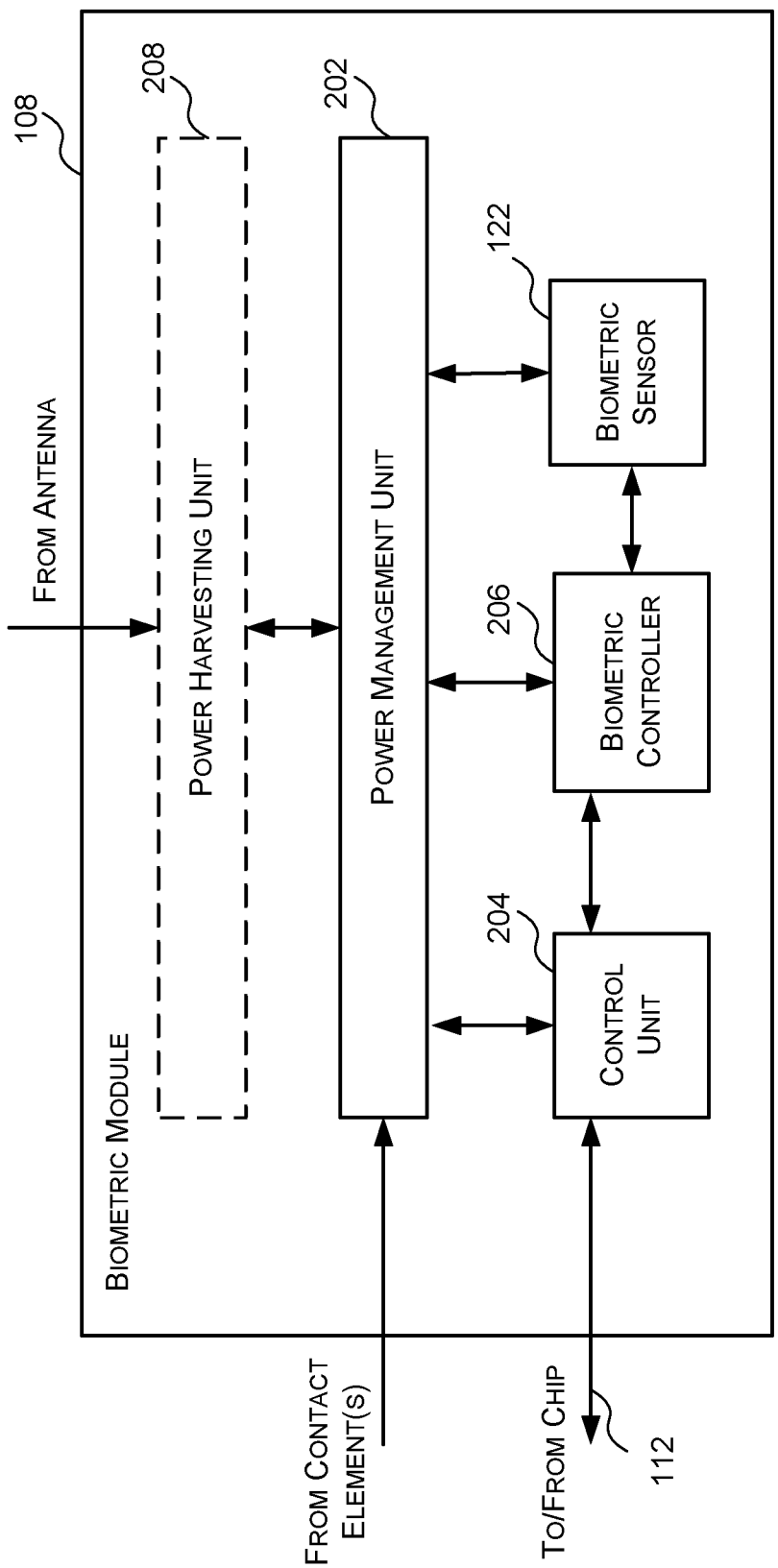
FIG. 2 is a block diagram of an example implementation of the biometric module of FIG. 1.

Reference is now made to FIG. 2 which illustrates an example implementation of the biometric module 108 of FIG. 1. As described above, the biometric module 108 is configured to biometrically identify or authenticate a user of the device 100. The biometric module 108 comprises a power management unit 202, a control unit 204, a biometric controller 206, and the biometric sensor 122. In some cases (e.g. when the device 100 adopts an architecture in which both the chip 106 and the biometric module 108 are connected to the antenna 104) the biometric module 108 may also comprise a power harvesting unit 208. The components of the biometric module 108 may be interconnected via any suitable means (e.g. via individual communication links or via a bus that is common to one or more of the components).

In the examples described herein the biometric module 108 does not have its own power source or supply and relies on power received from the contact element(s) 110 when the device 100 is operating in contact mode or the antenna 104 when the device 100 is operating in contactless mode, which may be received directly from the contact element(s) 110 or the antenna 104 respectively, or via the chip 106. Accordingly, the power management unit 202 may receive power from: the contact element(s) when the device 100 is operating in contact mode, the power harvesting unit 208 (if the biometric module 108 has one) when the device 100 is operating in contactless mode, and/or from the chip 106 and manages or controls the distribution of power to the components of the biometric module 108. In some cases, when the device 100 is operating in contactless mode the power management unit 202 receives a rectified voltage from power harvested by the power harvesting unit 208.

The power management unit 202 may be physically interconnected to each of the control unit 204, the biometric controller 206, and the biometric sensor 122. This allows the power management unit 202 to control the power supplied to each of these components separately. The inclusion of the power management unit 202 within the biometric module 108 also enables the biometric module 108 to control the power consumption of each of its internal components independent of the chip 106.

The biometric sensor 122 is configured to capture biometric data of a user which can be used to identify or authenticate the user. In some examples, the biometric sensor 122 may capture the biometric data by capturing images of a biometric source. The biometric sensor 122 may be, for example, a fingerprint sensor (a single or double-sided sensor), a retina sensor, an iris sensor, a vein sensor, a facial sensor, or a voice/audio sensor etc.

The biometric controller 206 is configured to control the operation of the biometric sensor 122. The biometric controller 206 may, for example, be configured to instruct the biometric sensor 122 to enter acquisition mode in which the sensor captures biometric data (e.g. a fingerprint pattern, retina pattern, iris pattern etc.). The biometric controller 206 may receive any data captured by the biometric sensor 122 and provide the captured data to the control unit 204. In some cases, the biometric controller 206 may be able to transition the biometric sensor 122 between multiple states including an acquisition state and a low power state. In some cases, the biometric controller 206 may be implemented by an application-specific integrated circuit (ASIC).

The control unit 204 is configured to control the other components (the biometric controller 206 and the biometric sensor 122) to perform biometric authentication of a user. Specifically, the control unit 204 may be configured to: (i) control the operation of the biometric sensor 122 via the biometric controller 206 to obtain biometric data of a user which can be used to perform biometric authentication; and (ii) perform biometric matching to compare the biometric data captured by the biometric sensor 122 to stored template data to determine if the user is biometrically identified or authenticated. In some cases, the control unit 204 may be implemented as a micro controller unit (MCU).

In some cases, the control unit 204 may be configured to cause (via the biometric controller 206) the biometric sensor 122 to capture biometric data of a user for use in biometrically authenticating the user in response to receiving a request from the chip 106 to perform biometric authentication and/or in response to determining (e.g. from information received from the power management unit 202) that the biometric module 108 has received enough power to be enabled.

The control unit 204 may be configured to perform the biometric matching in any suitable manner. For example, if the biometric data captured by the biometric sensor 122 is an image, the control unit 204 may perform image matching to compare an image captured by the biometric sensor 122 to one or more stored template images. A template image is a trusted image. An image may be trusted in the sense it is taken to be of a biometric source belonging to the user of the device 100. To perform the image matching, the control unit 204 may perform feature extraction on the captured image to identify a set of one or more extracted features. The extracted features are then compared with the features of the template image(s) to determine if the captured image matches the template image. The control unit 204 may, for example, compare the features of the images to determine a matcher score for the captured image. The captured image may be considered to match the template image(s) if the matcher score is above a predetermined threshold.

The control unit 204 may communicate an indication that the user has been biometrically authenticated to the chip 106. The chip 106 may then communicate an indication that the user of the device 100 has been authenticated back to the terminal 102. The authentication of the card user may enable the primary function associated with the device 100 to be completed. Alternatively, the control unit 204 may communicate to the chip 106 that the user was not successfully authenticated, in which case the primary function associated with the device 100 may not proceed, or may proceed in an altered fashion.

In an alternative example, the process of performing the biometric matching may be performed by the chip 106, rather than by the biometric module 108. Specifically, the biometric data captured by the biometric sensor 122 may be transmitted to the chip 106 and then the chip 106 performs the biometric matching. Thus, in these examples the biometric authentication is performed by both the chip 106 and the biometric module 108.

Figure 3:
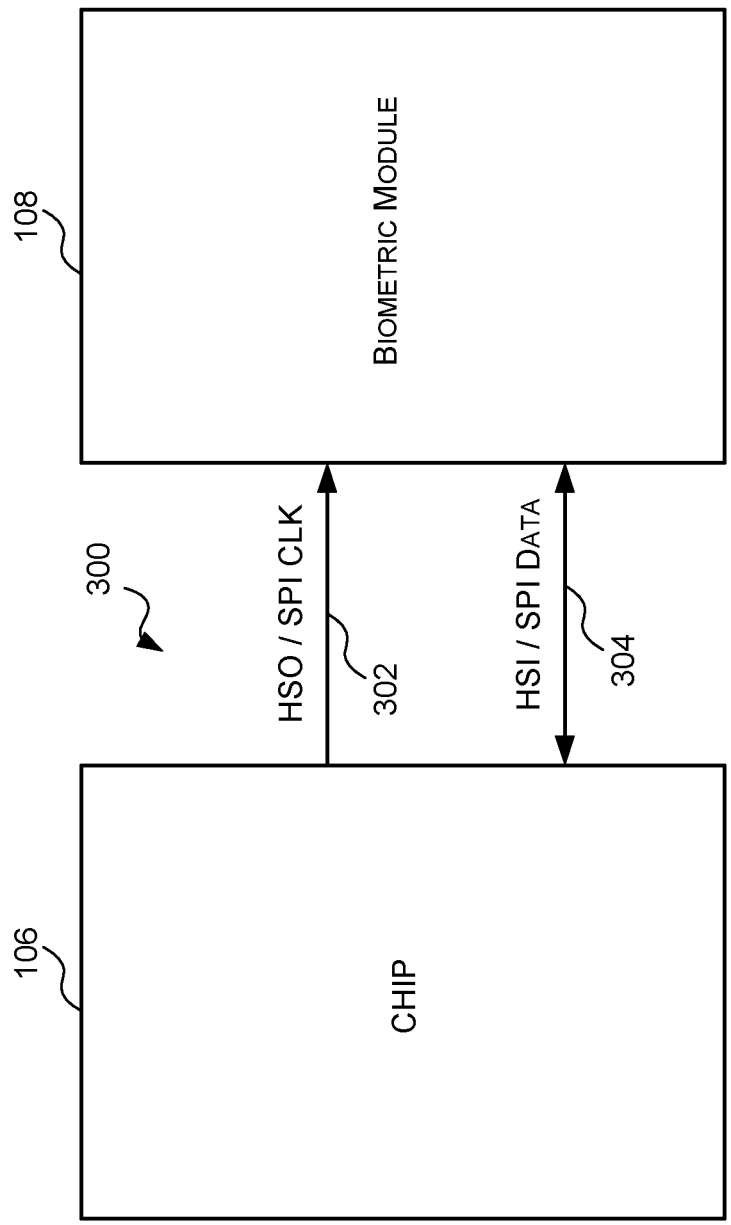
FIG. 3 is schematic diagram of a first example implementation of the interface of FIG. 1.

Reference is now made to FIG. 3 which illustrates a first example implementation of a 2-wire interface 300 which may be used to implement the interface 112 between the chip 106 and the biometric module 108. The interface 300 comprises a first wire or conductor 302 and a second wire or conductor 304. The interface 300 is operable in a handshaking mode and a data transfer mode. In the handshaking mode the first wire 302 is driven by the chip 106 and the second wire 304 is driven by the biometric module 304 to perform a handshaking sequence. Accordingly, in the handshaking mode the first wire is used to transmit the handshake out (HSO) signals and the second wire is used to transmit the handshake in (HSI) signals. The term "handshaking sequence" is used herein to mean a prescribed sequence of two or more signals or transitions between the chip 106 and the biometric module 108 to establish what the next stage of the process will be and/or when it will begin. Generally no substantive data is exchanged between the chip 106 and the biometric module 108 during a handshaking sequence. As described in more detail below, a handshaking sequence may be performed to initiate a command-response sequence, to indicate that one device is ready to receive data or to transmit data etc.

In the data transfer mode, the first wire 302 is driven by the chip 106 to provide a clock signal and the second wire 304 is driven by either the chip 106 or the biometric module 108 depending on whether the chip 106 or the biometric module 108 is transmitting data. For example, if the chip 106 is transmitting data to the biometric module 108 then the chip 106 drives the second wire 304; and if the biometric module 108 is transmitting data to the chip 106 then the biometric module 108 drives the second wire 304. Accordingly, in the interface 300 of FIG. 3 the first wire 302 is always driven by the chip 106 (i.e. is an output of the chip 106); and the second wire 304 may be driven by either the chip 106 or the biometric module 108 (i.e. it is an output of the chip 106 or the biometric module 108).

In some cases, when the chip 106 and the biometric module 108 are operating the interface 300 in the data transfer mode, the chip 106 and the biometric module 108 are configured to perform an SPI data transfer (i.e. a data transfer in accordance with the SPI protocol). Accordingly, in these cases when the interface 300 is being operating in the data transfer mode the interface 300 acts as an SPI interface. As is known to those of skill in the art, an SPI interface is a synchronous serial communication interface specification used for short-distance communication. An SPI interface is often implemented as a four-wire interface wherein a first wire is used to transmit a clock signal (which may be referred to as SPI CLK, SCLK or SCK), a second wire is used to transmit a chip select signal (which may be referred to as CS) which is used to select the slave (where there are multiple slaves), a third wire is used to transmit a master out, slave in (MOSI) signal, and the fourth wire is used to transmit a master in, slave out (MISO) signal. The device that generates the clock is the master, and data that is transmitted between the master and slave is synchronized to the clock generated by the master. When the interface 300 is being operated in an SPI data transfer mode, the first wire 302 is used to provide the SCLK or SCK (serial clock) signal and the second wire 304 is used to transmit the MISO or MOSI signal depending on whether the chip 106 or the biometric module 108 is transmitting data.

In some cases, the chip 106 may be configured to control the biometric module 108 through a command-response based operation or method. As is known to those of skill in the art, in command-response operation a command-response sequence is initiated by the host or master (e.g. chip 106) sending a command to the slave (e.g. biometric module 108). In response to receiving the command, the slave (e.g. biometric module 108) executes the command and sends a response back to the master (e.g. chip 106). In some cases, during a command-response sequence between the chip 106 and the biometric module 108 there is at least one mode transition of the interface 300. Specifically, in these cases, the chip 106 and the biometric module 108 may be configured to transition from operating the interface 300 in the handshaking mode to operating the interface 300 in the data transfer mode; and/or transition from operating the interface 300 in data transfer mode to operating the interface 300 in the handshaking mode at least once. For example, in some cases, the chip 106 and biometric module 108 may be configured to start with the interface in the handshaking mode, and after completing a handshaking sequence, transition the interface 300 to the data transfer mode so that the chip 106 can initiate a command (e.g. transmit a command or a command header). The interface 300 may then alternate between the handshaking mode and the data transfer mode until the command-response sequence is complete (e.g. the biometric module 108 transmits a response to the command). There may be different handshaking sequences that are performed at different points of the command-response sequence.

Figure 4:
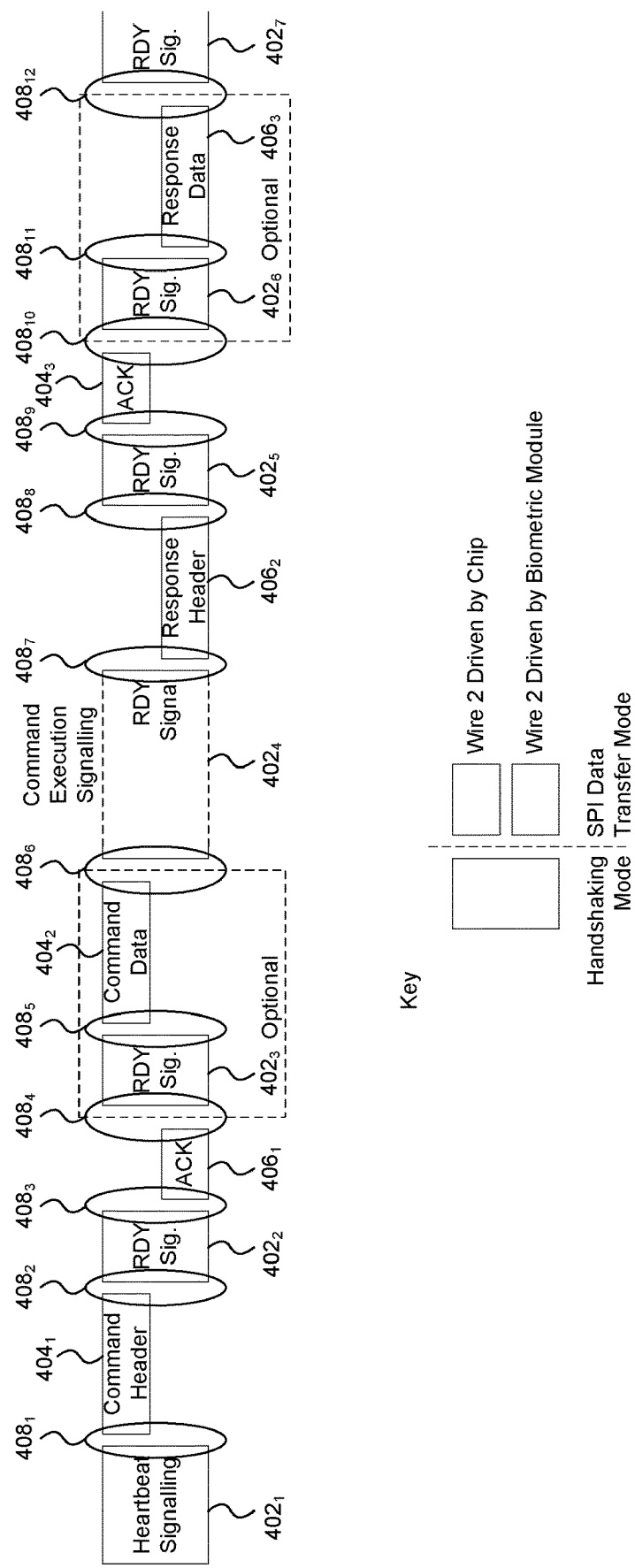
FIG. 4 is a schematic diagram illustrating an example command-response sequence and an example set of mode transitions.

Reference is now made to FIG. 4 which illustrates an example command-response sequence and the mode transitions that may occur during the command-response sequence. In this example a tall rectangle 402 is used to indicate that the interface 300 is operating in the handshaking mode; an upper short rectangle 404 is used to indicate that the interface 300 is operating in the data transfer mode and the chip 106 is driving the second wire 304 (i.e. the chip 106 is transmitting data); a lower short rectangle 406 is used to indicate that the interface 300 is operating in the data transfer mode and the biometric module 108 is driving the second wire 304 (i.e. the biometric module 108 is transmitting data); and an oval 408 is used to indicate a mode transition.

It can be seen that in the example of FIG. 4 the interface 300 starts in the handshaking mode $402_1$ where the chip 106 and the biometric module 108 perform a heartbeat handshaking sequence. In some cases, the heartbeat handshaking sequence may be performed to notify the biometric module 108 that the chip 106 would like the biometric module 108 to do some work (e.g. perform an action or execute a command) and to confirm that the biometric module 108 is ready to perform the command. In some cases, when the biometric module 108 is not executing a command-response sequence with the chip 106, the biometric module 108 may enter a low power mode. In these cases, the heartbeat handshaking sequence may cause the biometric module 108 to wake from the low power mode.

Once the heartbeat handshaking sequence is complete, the interface 300 is transitioned $408_1$ to the data transfer mode $404_1$ where the chip 106 transmits a command header. The command header may specify the command that is to be executed by the biometric module 108 (e.g. the action that is to be performed by the biometric module). For example, the command header may specify that the biometric module 108 is to perform biometric authentication of the user of the device 100. Once the command header has been transmitted, the interface is transitioned $408_2$ back to the handshaking mode $402_2$ where a ready handshaking sequence is performed. The ready handshaking sequence may be performed to indicate that the biometric module 108 is ready to transmit data. Once the ready handshaking sequence is complete the interface 300 is transitioned $408_3$ to the data transfer mode $406_1$ where the biometric module 108 transmits an acknowledgement of the command header. Once the acknowledgement has been transmitted, the interface 300 is transitioned to the handshaking mode $402_3$ or $402_4$ at $408_4$ or $408_6$, depending on whether command data is to be transmitted to the biometric module in addition to the command header.

Specifically, in some cases, additional information (which may be generally referred to as command data) may be provided to the biometric module after the command header which is to be used by the biometric module 108 in executing the command. The command data may, for example, specify parameters for executing the command specified in the command header and/or information which is to be used by the biometric module 108 in executing the command. In these cases, after the acknowledgement of the command header has been transmitted by the biometric module 108 the interface 300 is transitioned $408_4$ to the handshaking mode $402_3$ where a ready handshaking sequence may be performed. The ready handshaking sequence may be performed to indicate that the biometric module 108 is ready to receive data. Once the ready handshaking sequence is complete the interface 300 is transitioned $408_5$ to the data transfer mode $404_2$ where the chip 106 transmits the command data. Once the command data has been transmitted the interface 300 is transitioned back to the handshaking mode $402_4$. Where, however, there is no command data, then after the acknowledgement of the command header has been transmitted the interface 300 may be transitioned at $408_6$ to the handshaking mode $402_4$.

Once in the handshaking mode $402_4$, a command execution handshaking sequence may be executed while the biometric module 108 is executing the command, and once the command has been executed by the biometric module 108, a ready handshaking sequence may be performed. The ready handshaking sequence may be performed to indicate that the biometric module 108 is now ready to transmit data.

Once the ready handshaking sequence has been performed, the interface 300 is transitioned $408_7$ to the data transfer mode $406_2$ where the biometric module 108 transmits a response header. Once the response header has been transmitted, the interface 300 is transitioned $408_8$ back to the handshaking mode $402_5$ where a ready handshaking sequence is performed. The ready handshaking sequence may be performed to indicate that the biometric module 108 is ready to receive data. Once the ready handshaking sequence is complete, the interface 300 is transitioned to the data transfer mode $404_3$ where the chip 106 transmits an acknowledgement of the response header. Once the acknowledgement has been transmitted, the interface 300 is transitioned to the handshaking mode $402_6$ or $402_7$ at $408_{10}$ or $408_{12}$ depending on whether response data is to be transmitted to the chip 106 in addition to the response header.

Specifically, in some cases, additional information (which may be referred to as response data) may be provided to the chip 106 after the response header. In these cases, after the acknowledgement of the response header has been transmitted by the chip 106, the interface 300 is transitioned $408_{10}$ to the handshaking mode $402_6$ where a ready handshaking sequence may be performed. The ready handshaking sequence may be performed to indicate that the biometric module 108 is ready to transmit data. Once the ready handshaking sequence is complete the interface 300 is transitioned $408_{11}$ to the data transfer mode $406_3$ where the biometric module 108 transmits the response data. Once the response data has been transmitted the interface 300 is transitioned back $408_{12}$ to the handshaking mode $402_7$ where the chip 106 may, for example, start a heartbeat handshaking sequence to initiate another command-response sequence. Once the biometric module 108 has transmitted the response data the biometric module 108 may enter a low power mode. Where, however, there is no response data then after the acknowledgement of the response header has been transmitted the interface 300 may be transitioned at $408_{12}$ to the handshaking mode $402_7$ where the chip 106 may, for example, start a heartbeat handshaking sequence to initiate another command-response sequence. In this case the biometric module 108 may be configured to enter a low power mode once it has received the response header acknowledgment.

In some cases, as shown in FIG. 4, a transition from operating the interface 300 in the handshaking mode to operating the interface 300 in data transfer mode may be triggered by the completion of a handshaking sequence (e.g. heartbeat handshaking sequence, ready handshaking sequence). In these cases, to ensure the chip 106 and the biometric module 108 have sufficient time to reconfigure themselves to operate the interface 300 in the data transfer mode, the chip 106 and the biometric module 108 may be configured to operate the interface 300 in the data transfer mode only after a handshake-to-data threshold amount of time has elapsed after the completion of the handshaking sequence. The handshake-to-data threshold may be determined empirically.

Where a transition from operating the interface in handshaking mode to operating the interface in data transfer mode causes a different device/module to drive the second wire in the data transfer mode than in the handshaking mode (e.g. when there is a transition from the handshaking mode where the biometric module 108 drives the second wire to a data transfer mode in which the chip 106 drives the second wire) the biometric module 108 may be configured to cease driving the second wire after a handshake-to-undriven threshold amount of time has elapsed after the completion of the handshaking sequence. The handshake-to-undriven threshold may be selected to be less than the handshake-to-data threshold so that, for a period of time after completion of the handshaking sequence, the second wire is undriven. This avoids contention for the second wire when transitioning from handshaking mode to data transfer mode.

In some cases, as shown in FIG. 4, a transition from operating the interface 300 in data transfer mode to operating the interface in handshaking mode may be triggered by the completion of a data transfer (e.g. the transmission of a command header, command data, acknowledgment, response header or response data). In these cases, to ensure the chip 106 and the biometric module 108 have sufficient time to reconfigure themselves to operate the interface 300 in the handshaking mode, the chip 106 and the biometric module 108 may be configured to operate the interface 300 in the handshaking mode only after a data-to-handshake threshold amount of time has elapsed after the completion of the data transfer. The data-to-handshake threshold amount of time may be determined empirically.

Where a transition from operating the interface in data transfer mode to operating the interface 300 in handshaking mode causes a different device/module to drive the second wire 304 in the handshaking mode than was driving the second wire 304 in the data transfer mode (e.g. when there is a transition from the data transfer mode where the chip 106 drives the second wire to a handshaking mode in which the biometric module 108 drives the second wire) the chip 106 may be configured to cease driving the second wire 304 after a data-to-undriven threshold amount of time has elapsed after the completion of the data transfer. The data-to-undriven threshold may be selected to be less than the data-to-handshake threshold so that, for a period of time after completion of the data transfer, the second wire is undriven. This avoids contention for the second wire when transitioning from data transfer mode to the handshaking mode.

Example handshaking sequences and transitions between modes (including example timing thresholds thereof) will be described below with reference to FIGS. 5 to 9. In these examples, when the interface 300 is being operated in the data transfer mode, the interface 300 acts as an SPI interface operating in SPI mode 3 (i.e. the clock polarity (CPOL) is set to one and the clock phase (CPHA) is set to 1) such that the first wire 302 is high before and after a data transfer. Since the quiescent state of the first wire 302 is also high there are no transitions on the first wire when switching between the handshaking and data transfer modes. However, it will be evident to a person of skill in the art that this is example only and that other SPI modes may be used and that other synchronous communications protocols may be used in data transfer mode.

Figure 5:
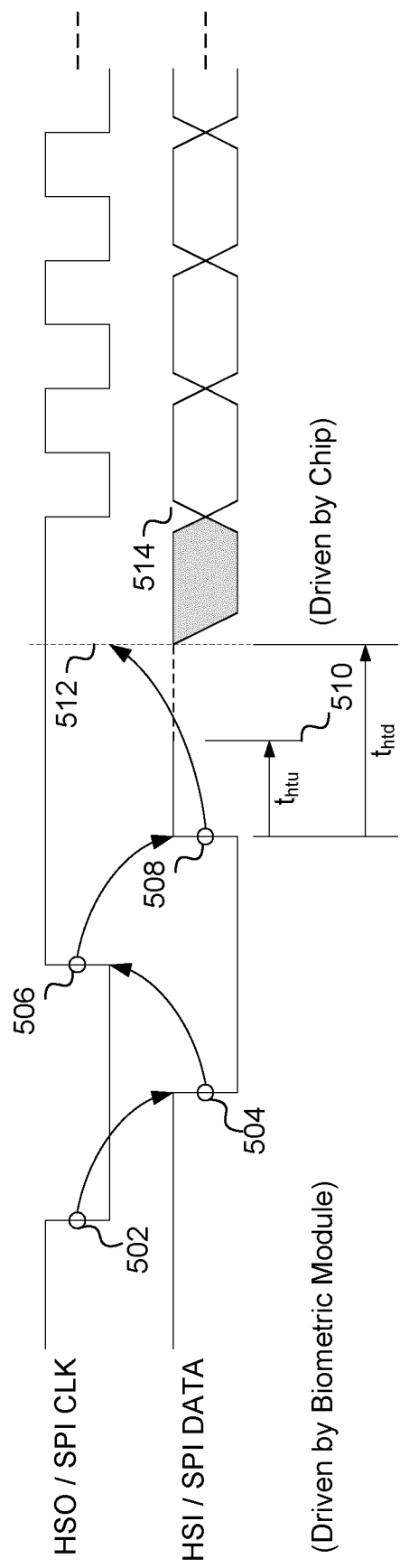
FIG. 5 is a timing diagram illustrating an example heartbeat handshaking sequence followed by a transition to a data transfer mode in which the chip is transmitting data.

Reference is now made to FIG. 5 which illustrates an example heartbeat handshaking sequence followed by a transition into a data transfer mode in which the chip 106 transmits the command header. In this example, the interface 300 begins in the handshaking mode and the chip 106 initiates the heartbeat handshaking sequence by sending a heartbeat signal on the first wire 302 at 502. In some cases, the chip 106 may send a heartbeat signal on the first wire 302 by causing a transition on the first wire from a first state to a second state. For example, as shown in FIG. 5 the chip 106 may send a heartbeat signal on the first wire 302 by driving the first wire low. The heartbeat on the first wire 302 is detected by the biometric module 108 (which may cause the biometric module 108 to transition from a low power mode to a normal operating mode) which causes the biometric module 108 to acknowledge the heartbeat on the second wire 304 at 504. In some cases, the biometric module 108 may acknowledge the heartbeat on the second wire 304 by causing a transition on the second wire from a first state to a second state. For example, as shown in FIG. 5 the biometric module 108 may acknowledge the heartbeat by driving the second wire 304 low.

In response to receiving the heartbeat acknowledgement the chip 106 removes the heartbeat on the first wire 302 at 506 but remains in the handshaking mode. In some cases, the chip 106 may remove the heartbeat on the first wire 302 by driving the first wire from the second state to the first state. For example, as shown in FIG. 5 the chip 106 may remove the heartbeat on the first wire 302 by driving the first wire 302 high. In response to detecting the removal of the heartbeat, the biometric module 108 sends a signal on the second wire 304 indicating that it is ready to receive data and will release the second wire 304 at 508. In some cases, the biometric module 108 may indicate that it is ready to receive data and will release the second wire by driving the second wire 304 from the second state back to the first state. For example, as shown in FIG. 5 the biometric module 108 may indicate that it is ready to receive data and release the second wire by driving the second wire 304 high. This may complete the heartbeat handshaking sequence which triggers a transition of the interface 300 to the data transfer mode.

Specifically, the chip 106 and the biometric module 108 may begin operating the interface 300 in the data transfer mode after a handshake-to-data threshold ($t_{htd}$) amount of time has elapsed since the completion of the heartbeat handshaking sequence (i.e. at 512). For example, after the handshake-to-data threshold amount of time has elapsed after the completion of the heartbeat handshaking sequence, the chip 106 may begin driving the first wire 302 to provide a clock signal as per an SPI data transfer and the second wire 304 to begin a data transfer (at 514). The handshake-to-data threshold may be selected so as to give the chip 106 and the biometric module 108 sufficient time to reconfigure themselves to operate the interface 300 in the data transfer mode. In some cases, the chip 106 and/or the biometric module 108 may have one module that operates the interface 300 in handshaking mode and a different module that operates the interface 300 in data transfer mode. For example, the chip 106 or the biometric module 108 may comprise an SPI module which operates the interface 300 in the data transfer mode and a handshaking module which operates the interface 300 in the handshaking mode. In these cases, the first and second wires of the interface 300 may be directed to the appropriate module depending on the mode. This direction of the signals to the appropriate module may be performed in hardware or software.

In preparation for the second wire 304 being driven by the chip 106 in data transfer mode, the biometric module 108 may stop driving the second wire 304 after a handshake-to-undriven threshold ($t_{htu}$) amount of time has elapsed after the completion of the heartbeat handshaking sequence (i.e. at 510). The handshake-to-undriven threshold is less than the handshake-to-data threshold so that there is a period of time where the second wire 304 is not driven by the chip 106 or the biometric module 108 to avoid contention for the second wire 304. The handshake-to-undriven threshold may be selected so as to give the chip 106 enough time to detect the indication that the biometric module 108 is ready to receive data yet give a sufficient period where the second wire 304 is not driven before the chip 106 begins driving the second wire 304. In some cases, the handshake-to-undriven threshold may be between 1 µs and 10 µs and the handshake-to-data threshold may be greater than 20 µs.

Figure 6:
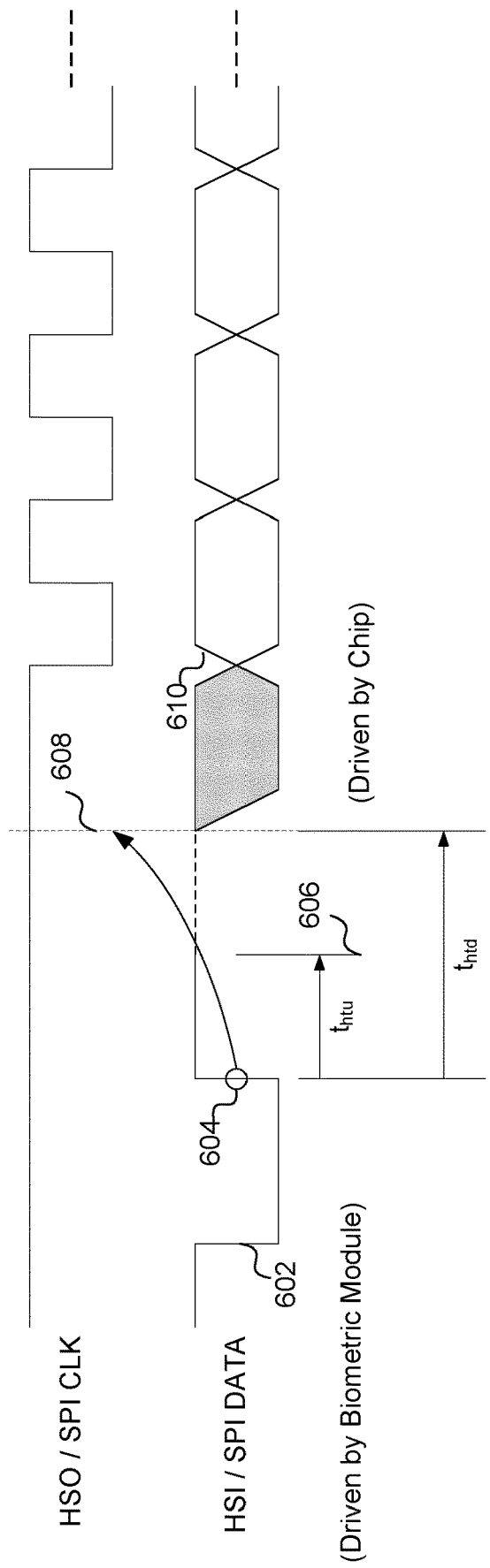
FIG. 6 is a timing diagram illustrating an example ready handshaking sequence followed by a transition to a data transfer mode in which the chip is transmitting data.

Reference is now made to FIG. 6 which illustrates an example ready handshaking sequence followed by a transition into a data transfer mode in which the chip 106 transmits data. This may be used to implement the ready handshaking sequence to command data transmission, or the ready handshaking sequence to response header acknowledgement transmission of FIG. 4. The ready handshaking sequence may be used to indicate that the biometric module 108 is ready to receive data. In this example the interface 300 begins in handshaking mode and the biometric module 108 initiates the ready handshaking sequence by driving the second wire 304 from a first state to a second state at 602. For example, as shown in FIG. 6 the biometric module 108 may initiate the ready handshaking sequence by driving the second wire 304 low. The biometric module 108 may then subsequently indicate the end of the ready handshaking sequence by driving the second wire 304 from the second state back to the first state at 604. For example, as shown in FIG. 6 the biometric module 108 may indicate the end of the ready handshaking sequence by driving the second wire 304 high. The completion of the ready handshaking sequence triggers a transition of the interface 300 to the data transfer mode.

Specifically, the chip 106 and the biometric module 108 may begin operating the interface 300 in the data transfer mode after a handshake-to-data threshold ($t_{htd}$) amount of time has elapsed since the completion of the ready handshaking sequence (i.e. at 608). For example, after the handshake-to-data threshold amount of time has elapsed after the completion of the ready handshaking sequence the chip 106 may begin driving the first wire 302 to provide a clock signal as per an SPI data transfer and driving the second wire 304 to begin a data transfer (at 610). As described above, the handshake-to-data threshold may be selected so as to give the chip 106 and the biometric module 108 sufficient time to reconfigure themselves to operate the interface 300 in the data transfer mode.

Similar to the example shown in FIG. 5, in preparation for the second wire 304 being driven by the chip 106 in data transfer mode, the biometric module 108 may stop driving the second wire after a handshake-to-undriven threshold ($t_{htu}$) amount of time has elapsed after the completion of the ready handshaking sequence (i.e. at 606). The handshake-to-undriven threshold is less than the handshake-to-data threshold so that there is period of time where the second wire 304 is not driven by the chip 106 or the biometric module 108 to avoid contention for the second wire 304. The handshake-to-undriven threshold may be selected as described above with respect to FIG. 5.

Figure 7:
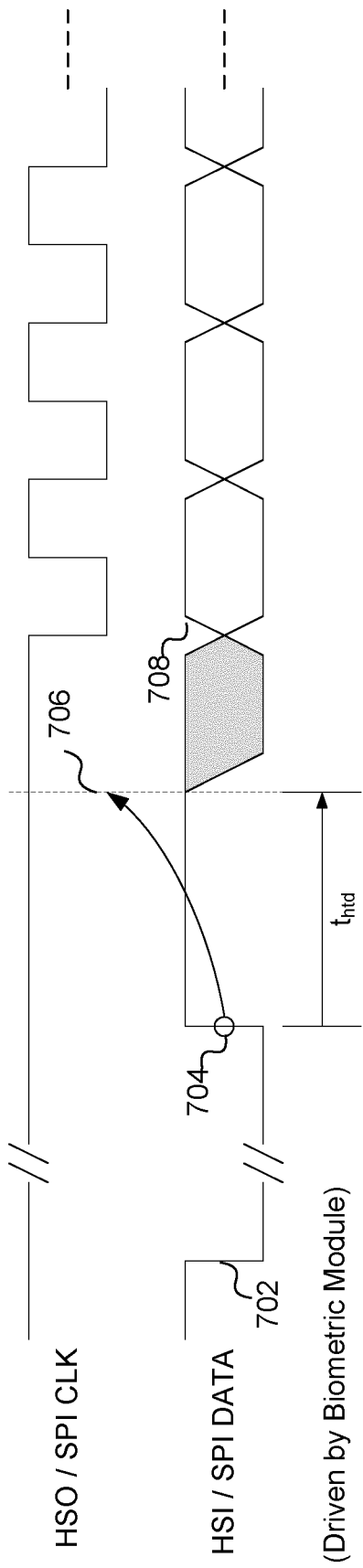
FIG. 7 is a timing diagram illustrating an example ready handshaking sequence followed by a transition to a data transfer mode in which the biometric module is transmitting data.

Reference is now made to FIG. 7 which illustrates an example ready handshaking sequence followed by a transition into a data transfer mode in which the biometric module 108 transmits data. This may be used to implement the ready handshaking sequence to command header acknowledgement transmission, the ready handshaking sequence to response header transmission, or the ready handshaking sequence to response data transmission of FIG. 4. The ready handshaking sequence may be used to indicate that the biometric module 108 is ready to transmit data. This example is very similar to the example shown in FIG. 6 but since the direction of the second wire 304 does not change when transitioning to the data transfer mode (i.e. the second wire is driven by the biometric module 108 in the handshaking mode and the subsequent data transfer mode) there is not a period where the second wire 304 is undriven as there is in the example of FIG. 6.

In this example, the interface 300 begins in handshaking mode and the biometric module 108 initiates the ready handshaking sequence by driving the second wire 304 from a first state to a second state at 702. For example, as shown in FIG. 7 the biometric module 108 may initiate the ready handshaking sequence by driving the second wire 304 low. The biometric module 108 may then subsequently indicate the end of the ready handshaking sequence by driving the second wire 304 from the second state back to the first state at 704. For example, as shown in FIG. 7 the biometric module 108 may indicate the end of the ready handshaking sequence by driving the second wire 304 high. The completion of the ready handshaking sequence triggers a transition of the interface 300 to the data transfer mode.

Specifically, the chip 106 and the biometric module 108 may begin operating the interface 300 in the data transfer mode after a handshake-to-data threshold ($t_{htd}$) amount of time has elapsed after the completion of the ready handshaking sequence (i.e. at 706). For example, after the handshake-to-data threshold amount of time has elapsed after the completion of the ready handshaking sequence, the chip 106 may begin driving the first wire 302 to provide a clock signal as per an SPI data transfer (at 706) and the biometric module 108 may begin driving the second wire 304 to begin an SPI data transfer (at 708). As described above, the handshake-to-data threshold may be selected so as to give the chip 106 and the biometric module 108 sufficient time to reconfigure themselves to operate the interface 300 in the data transfer mode.

Figure 8:
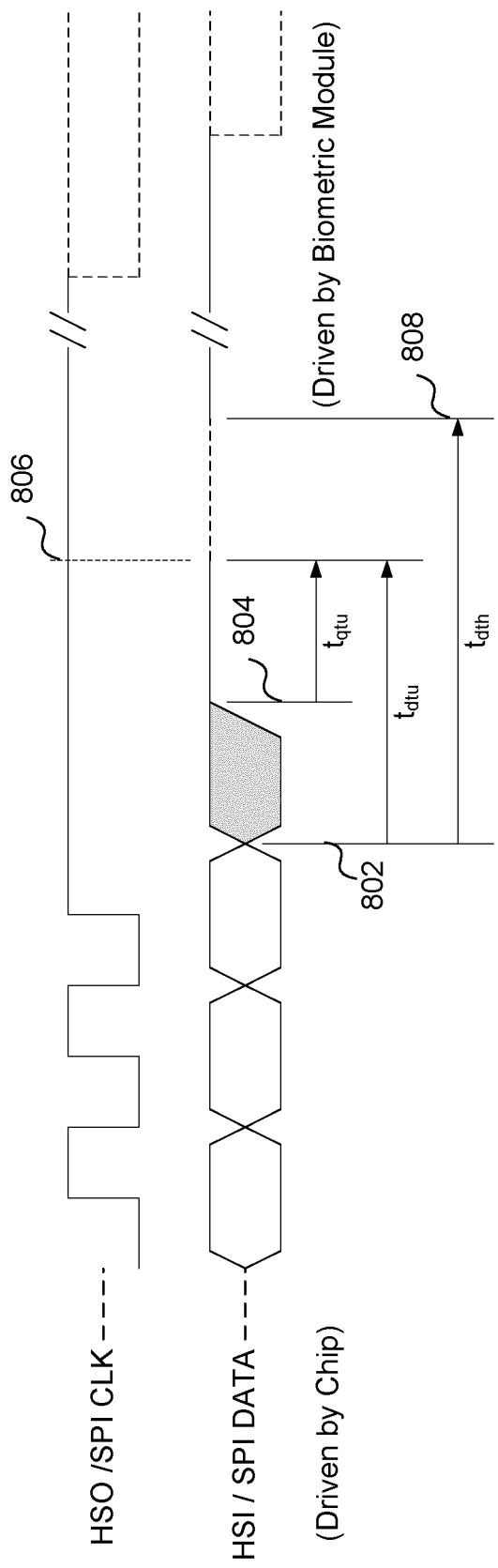
FIG. 8 is a timing diagram illustrating an example chip data transfer followed by a transition to the handshaking mode.

Reference is now made to FIG. 8 which illustrates an example chip 106 data transfer followed by a transition into a handshaking mode. This may be used to implement the command header transmission to ready handshaking sequence, the command data transmission to command execution handshaking sequence, or the response header acknowledgment transmission to ready handshaking sequence of FIG. 4. In this example, the interface 300 begins in the data transfer mode. The completion of the data transfer (at 802) triggers a transition to the handshaking mode.

Specifically, the chip 106 and the biometric module 108 may be configured to begin operating the interface 300 in handshaking mode after a data-to-handshake threshold ($t_{dth}$) amount of time has elapsed since the completion of the data transfer (i.e. at 808). The data-to-handshake threshold may be selected so as to give the biometric module 108 and the chip 106 sufficient time to reconfigure themselves to operate the interface 300 in the handshaking mode. As described above, in some cases the chip 106 and/or the biometric module 108 may have one module that operates the interface 300 in handshaking mode and a different module that operates the interface 300 in data transfer mode. For example, the chip 106 or the biometric module 108 may comprise an SPI module which operates the interface 300 in the data transfer mode and a handshaking module which operates the interface 300 in the handshaking mode. In these cases, the first and second wires of the interface 300 may be directed to the appropriate module depending on the mode. This direction of the signals to the appropriate internal module may be performed in hardware or software.

In preparation for the second wire 304 being driven by the biometric module 108 in the handshaking mode, the chip 106 may stop driving the second wire 304 after a data-to-undriven threshold ($t_{dtu}$) amount of time has elapsed after the completion of the data transfer (i.e. at 806). The data-to-undriven threshold is less than the data-to-handshake threshold so that there is a period of time after completion of the data transfer where the second wire 304 is not driven by the chip 106 or the biometric module 108 to avoid contention for the second wire 304 when transitioning to the handshaking mode.

In some cases, as shown in FIG. 8, the chip 106 may be configured to, a certain period of time after completion of the data transfer (i.e. at 804), drive both the first and second wires 302, 304 high. In these cases, the time period between driving the second wire 304 high—its quiescent state—and the second wire being undriven may be referred to herein as the quiescent-to-undriven threshold ($t_{qtu}$). In these cases the data-to-undriven threshold may be selected so that the quiescent-to-undriven threshold is sufficiently long to ensure that the second wire is high before it is undriven, yet there is a sufficient period where the second wire is not driven by the chip 106 before the second wire is driven by the biometric module 108 to avoid contention.

In some cases, the quiescent-to-undriven threshold may be greater than 1 μs, the data-to-undriven threshold may be less than 10 μs, and the data-to-handshake threshold may be greater than 20 μs.

Figure 9:
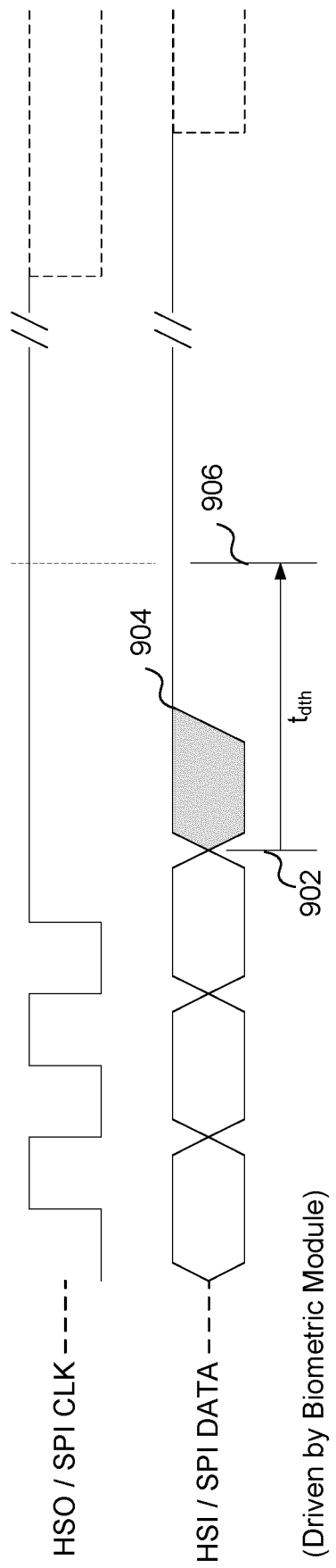
FIG. 9 is a timing diagram illustrating an example biometric module transfer followed by a transition to the handshaking mode.

Reference is now made to FIG. 9 which illustrates an example biometric module 108 data transfer followed by a transition into a handshaking mode. This may be used to implement the command header acknowledgement transmission to ready handshaking sequence, the response header transmission to ready handshaking sequence, or the response data transmission to ready handshaking sequence of FIG. 4. This example is similar to the example shown in FIG. 8 except the second wire 304 does not change direction when transitioning from the data transfer mode to the handshaking mode.

In this example the interface 300 begins in the data transfer mode. The completion of the data transfer (at 902) triggers a transition to the handshaking mode.

Specifically, the chip 106 and the biometric module 108 may be configured to begin operating the interface 300 in the handshaking mode after a data-to-handshake threshold ($t_{dth}$) amount of time has elapsed since the completion of the data transfer (i.e. at 906). The data-to-handshake threshold may be selected so as to give the biometric module 108 and the chip 106 sufficient time to reconfigure themselves to operate the interface 300 in the handshaking mode.

In some cases, as shown in FIG. 9, the biometric module 108 may be configured to, a certain period of time after completion of the data transfer (i.e. at 904), disable the SPI block and configure the first wire 302 as a handshaking input and configure the second wire 304 as a handshaking output and initially driving the handshaking output high.

Figure 10:
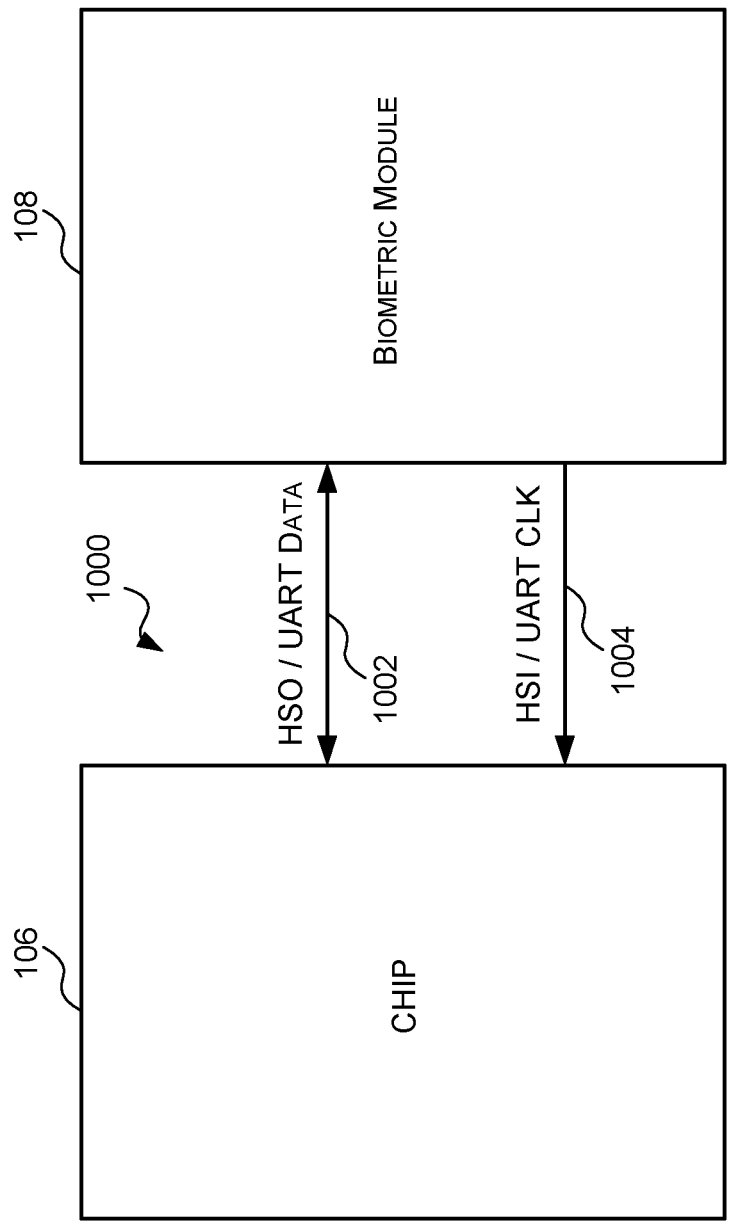
FIG. 10 is a schematic diagram of a second example implementation of the interface of FIG. 1.

Reference is now made to FIG. 10 which illustrates a second example implementation of a two-wire interface 1000 which may be used to implement the interface 112 between the chip 106 and the biometric module 108. The interface 1000 comprises a first wire or conductor 1002 and a second wire or conductor 1004. The interface 1000 is operable in a handshaking mode and a data transfer mode. In the handshaking mode the first wire 1002 is driven by the chip 106 and the second wire 1004 is driven by the biometric module 108 to perform a handshaking sequence. Accordingly, in the handshaking mode the first wire 1002 is used to transmit the handshake out (HSO) signals and the second wire 1004 is used to transmit the handshake in (HSI) signals. In the data transfer mode, the second wire 1004 is driven by the biometric module 108 to provide a clock signal and the first wire 1002 is driven by either the chip 106 or the biometric module 108 depending on whether the chip 106 or the biometric module 108 is transmitting data. For example, if the chip 106 is transmitting data to the biometric module 108 then the chip 106 drives the first wire 1002; and if the biometric module 108 is transmitting data to the chip 106 then the biometric module 108 drives the first wire 1002. Accordingly, in the interface 1000 of FIG. 10 the second wire 1004 is always driven by the biometric module 108 (i.e. is an output of the biometric module 108); and the first wire 1002 may be driven by either the chip 106 or the biometric module 108 (i.e. it is an output of the chip 106 or the biometric module 108).

In some cases, when the interface 1000 is operating in the data transfer mode, the data transfer is performed in accordance with an ISO 7816 Universal Asynchronous Receiver/Transmitter (UART) interface. Accordingly, in these cases, when the chip 106 and the biometric module 108 are operating the interface 1000 in the data transfer mode the interface acts as an UART interface. As is known to those of skill in the art, a UART interface comprises at least one data wire over which data is transmitted and may have a wire over which a clock signal is transmitted.

To transmit a data packet (e.g. byte) over a data wire a bit called the 'start bit' is used to alert the receiver that a data packet is about to be sent, and to force the clock in the receiver into synchronisation with the clock of the transmitter. After the start bit, the individual bits of the data packet are sent. In some cases, an error detection bit (i.e. a parity bit) may be added after the bits of the data packet to aid the receiver in determining if there is an error in the data packet After all of the individual bits have been sent (and, optionally the parity bit) one or more 'stop bits' is sent to signal the end of the data packet (e.g. byte). When the receiver receives the start bit it starts reading the incoming bits at a specified frequency known as the baud rate. As is known to those of skill in the art, baud rate is a measure of the speed of the data transfer, expressed in bits per second (bps).

In some cases, a common clock signal may also be used. Unlike a synchronous communication protocol, such as SPI, where the position of the clock edge determines where data is transmitted or sampled, for UART (an asynchronous communication protocol) the clock signal is only used to derive the baud rate. For example, the transmitter and the recipient of the clock signal select the baud rate to be proportional to the frequency of the received clock signal. One or more of the UART parameters may be configurable such as, but not limited to, the number of data bits in a packet, whether or not a parity bit is generated/checked, the number of stop bits, the frequency relationship between the clock signal and the baud rate and the number of data lines/wires.

An ISO 7816 UART interface is a UART interface configured in accordance with ISO 7816. More specifically, an ISO 7816 UART interface is a UART interface in which one or more of the UART parameters are specified or restricted to be in accordance with the ISO 7816 standard. For example, ISO 7816 specifies that a data packet has eight bits and so an ISO 7816 UART interface would be configured to use 8-bit data packets.

When the interface 1000 is operating in the UART data transfer mode, the second wire 1004 is used to provide the clock signal (UART CLK) and the first wire 1002 is used to transmit data (UART DATA).

As described above, in some cases, the chip 106 may be configured to control the biometric module 108 through a command-response based operation or method. As is known to those of skill in the art, in command-response based operation a command-response sequence is initiated by the host or master (e.g. chip 106) sending a command to the slave (e.g. biometric module 108). In response to receiving the command, the slave (e.g. biometric module 108) executes the command and sends a response back to the master (e.g. chip 106). In some cases, during a command-response sequence between the chip 106 and the biometric module 108 there is at least one mode transition of the interface 1000. Specifically the chip 106 and the biometric module 108 are configured to transition the interface 1000 from operating in the handshaking mode to operating in the data transfer mode; and/or transition the interface 1000 from operating in the data transfer mode to operating in the handshaking mode at least once. For example, in some cases the chip 106 and biometric module 108 may be configured to start with the interface in the handshaking mode, and after completing a handshaking sequence transition the interface 1000 to the data transfer mode where the chip 106 can initiate a command (e.g. transmit a command or a command header). The interface 300 may then alternate between the handshaking mode and the data transfer mode until the command-response sequence is complete (e.g. until the biometric module 108 transmits a response to the command). There may be different handshaking sequences that are performed at different points of the command-response sequence.

Figure 11:
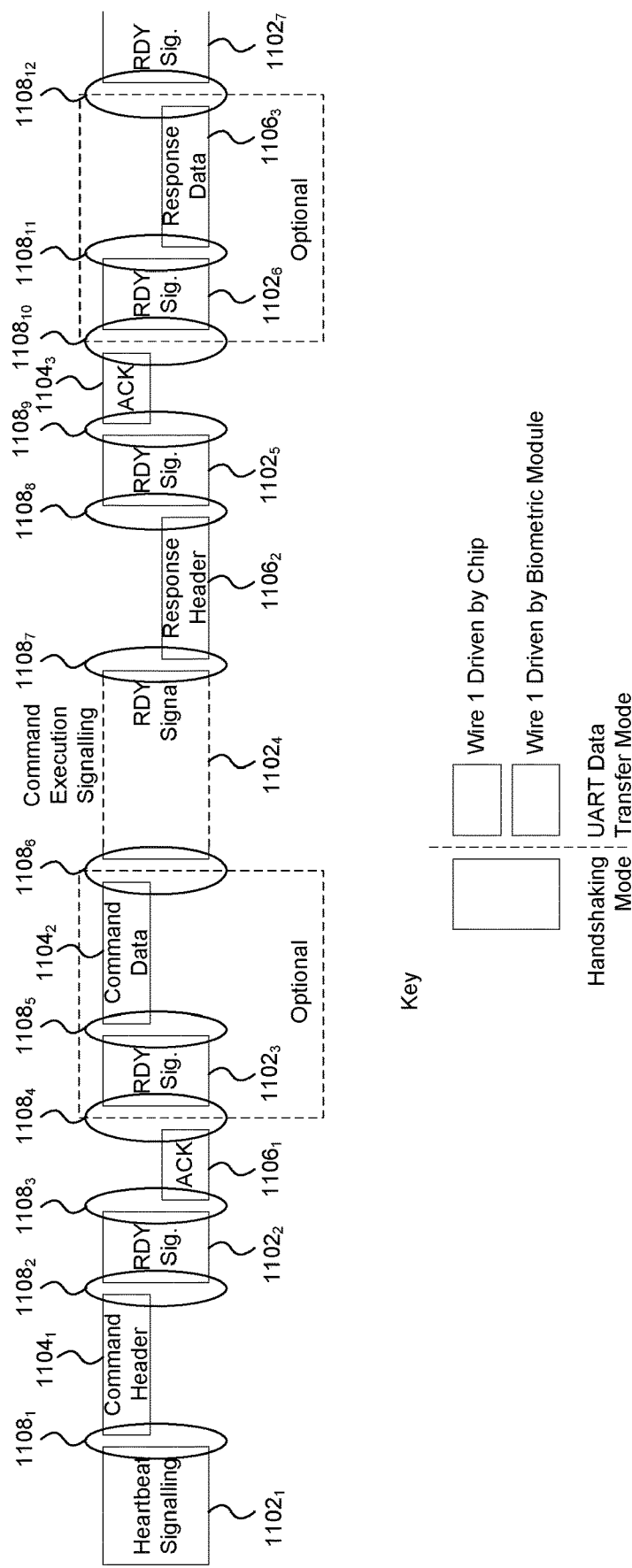
FIG. 11 is a schematic diagram illustrating a first example command-response sequence and a first example set of mode transitions.

Reference is now made to FIG. 11 which illustrates an example command-response sequence and the mode transitions that may occur during the command-response sequence. In this example a tall rectangle 1102 is used to indicate that the interface is operating in the handshaking mode; an upper short rectangle 1104 is used to indicate that the interface is operating in the data transfer mode and the chip 106 is driving the first wire 1002 (i.e. the chip 106 is transmitting data); a lower short rectangle 1106 is used to indicate that the interface is operating in the data transfer mode and the biometric module 108 is driving the first wire 1102 (i.e. the biometric module 108 is transmitting data); and an oval 1108 is used to indicate a mode transition.

It can be seen that in the example of FIG. 11 the interface 1000 starts in the handshaking mode $1102_1$ where the chip 106 and the biometric module 108 perform a heartbeat handshaking sequence. In some cases, the heartbeat handshaking sequence may be performed to notify the biometric module 108 that the chip 106 would like the biometric module 108 to do some work (e.g. perform an action or execute a command) and to verify or confirm that the biometric module 108 is ready to execute the command. In some cases, when the biometric module 108 is not executing a command-response sequence with the chip 106, the biometric module 108 may enter a low power mode. In these cases, the heartbeat handshaking sequence may cause the biometric module 108 to transition from the low power mode to a normal operating mode. Once the heartbeat handshaking sequence is complete, the interface 1000 is transitioned $1108_1$ to the data transfer mode $1104_1$ where the chip 106 transmits a command header. The command header may specify the command that is to be executed by the biometric module 108 (e.g. the action that is to be performed by the biometric module 108). For example, the command header may specify that the biometric module 108 is to perform biometric authentication of the user of the device 100. Once the command header has been transmitted, the interface is transitioned $1108_2$ back to the handshaking mode $1102_2$ where a ready handshaking sequence is performed. The ready handshaking sequence may be performed to indicate that the biometric module 108 is ready to transmit data. Once the ready handshaking sequence is complete the interface 1000 is transitioned $1108_3$ to the data transfer mode $1106_1$ where the biometric module 108 transmits an acknowledgement of the command header. Once the acknowledgement has been transmitted the interface 1000 is transitioned to the handshaking mode $1102_3$ or $1102_4$ at $1108_4$ or $1108_6$ depending on whether command data is to be transmitted to the biometric module in addition to the command header.

As described above, in some cases, additional information (which may be generally referred to as command data) may be provided to the biometric module 108 after the command header which is to be used by the biometric module 108 in executing the command. The command data may, for example, specify parameters for executing the command specified in the command header and/or information which is to be used by the biometric module 108 in executing the command. In these cases, after the acknowledgement of the command header has been transmitted by the biometric module 108, the interface 1000 is transitioned $1108_4$ to the handshaking mode $1102_3$ where a ready handshaking sequence may be performed. The ready handshaking sequence may be performed to indicate that the biometric module 108 is ready to receive data. Once the ready handshaking sequence is complete the interface 1000 is transitioned $1108_5$ to the data transfer mode $1104_2$ where the chip 106 transmits the command data. Once the command data has been transmitted the interface 1000 is transitioned $1108_6$ back to the handshaking mode $1102_4$. Where, however, there is no command data, then after the acknowledgement of the command header has been transmitted the interface 1000 may be transitioned at $1108_6$ to the handshaking mode $1102_4$.

Once in the handshaking mode $1102_4$ a command execution handshaking sequence may be executed while the biometric module 108 is executing the command, and once the command has been executed by the biometric module 108 a ready handshaking sequence may be performed. The ready handshaking sequence may be performed to indicate that the biometric module 108 is now ready to transmit data.

Once the ready handshaking sequence has been performed the interface 1000 is transitioned $1108_7$ to the data transfer mode $1106_2$ where the biometric module 108 transmits a response header. Once the response header has been transmitted the interface 1000 is transitioned $1108_8$ back to the handshaking mode $1102_5$ where a ready handshaking sequence is performed. The ready handshaking sequence may be performed to indicate that the biometric module 108 is ready to receive data. Once the ready handshaking sequence is complete the interface 1000 is transitioned $1108_9$ to the data transfer mode $1104_3$ where the chip 106 transmits an acknowledgement of the response header. Once the acknowledgement has been transmitted, the interface 1000 is transitioned to the handshaking mode $1102_6$ or $1102_7$ at $1108_{10}$ or $1108_{12}$ depending on whether response data is to be transmitted to the chip 106 in addition to the response header.

Specifically, in some cases, additional information (which may be referred to as response data) may be provided to the chip 106 after the response header. In these cases, after the acknowledgement of the response header has been transmitted by the chip 106, the interface 1000 is transitioned $1108_{10}$ to the handshaking mode $1102_6$ where a ready handshaking sequence may be performed. The ready handshaking sequence may be performed to indicate that the biometric module 108 is ready to transmit data. Once the ready handshaking sequence is complete the interface 1000 is transitioned $1108_{11}$ to the data transfer mode $1106_3$ where the biometric module 108 transmits the response data. Once the response data has been transmitted the interface 1000 is transitioned back $1108_{12}$ to the handshaking mode $1102_7$ where the chip 106 may, for example, initiate a heartbeat handshaking sequence to start a new command-response sequence. Where, however, there is no response data then after the acknowledgement of the response header has been transmitted the interface 1000 may be transitioned at $1108_{12}$ to the handshaking mode $1102_7$ where the chip 106 may, for example, initiate a heartbeat handshaking sequence to start a new command-response sequence Reference is now made to FIG. 12 which illustrates a second example command-response sequence and the mode transitions that may occur where the chip 106 and the biometric module 108 operate the interface 1000 in accordance with ISO 7816 UART when operating the interface 1000 in the data transfer mode. This example is similar to the example shown in FIG. 11 except that the interface 1000 is not transitioned back to the handshaking mode after each data transfer. Specifically, in this example, after completion of the heartbeat handshaking sequence the interface 1000 is transitioned to the data transfer mode, the interface 1000 then remains in the data transfer mode until the command-response sequence is complete except when the biometric module 108 is executing the command. While in an SPI data transfer the ready handshaking tells the SPI master (e.g. chip 106) when to turn on the clock (i.e. generate the clock signal) because the slave is ready to send or receive data, this is not necessary in a ISO 7816 UART data transfer as the protocol defines which device (e.g. chip 106 or biometric module 108) is going to send next. The reduced number of mode transitions in the example shown in FIG. 12 compared to the example shown in FIG. 11 may allow a command-response sequence to be performed more efficiently as it saves time in the overhead of switching modes unnecessarily.

Figure 12:
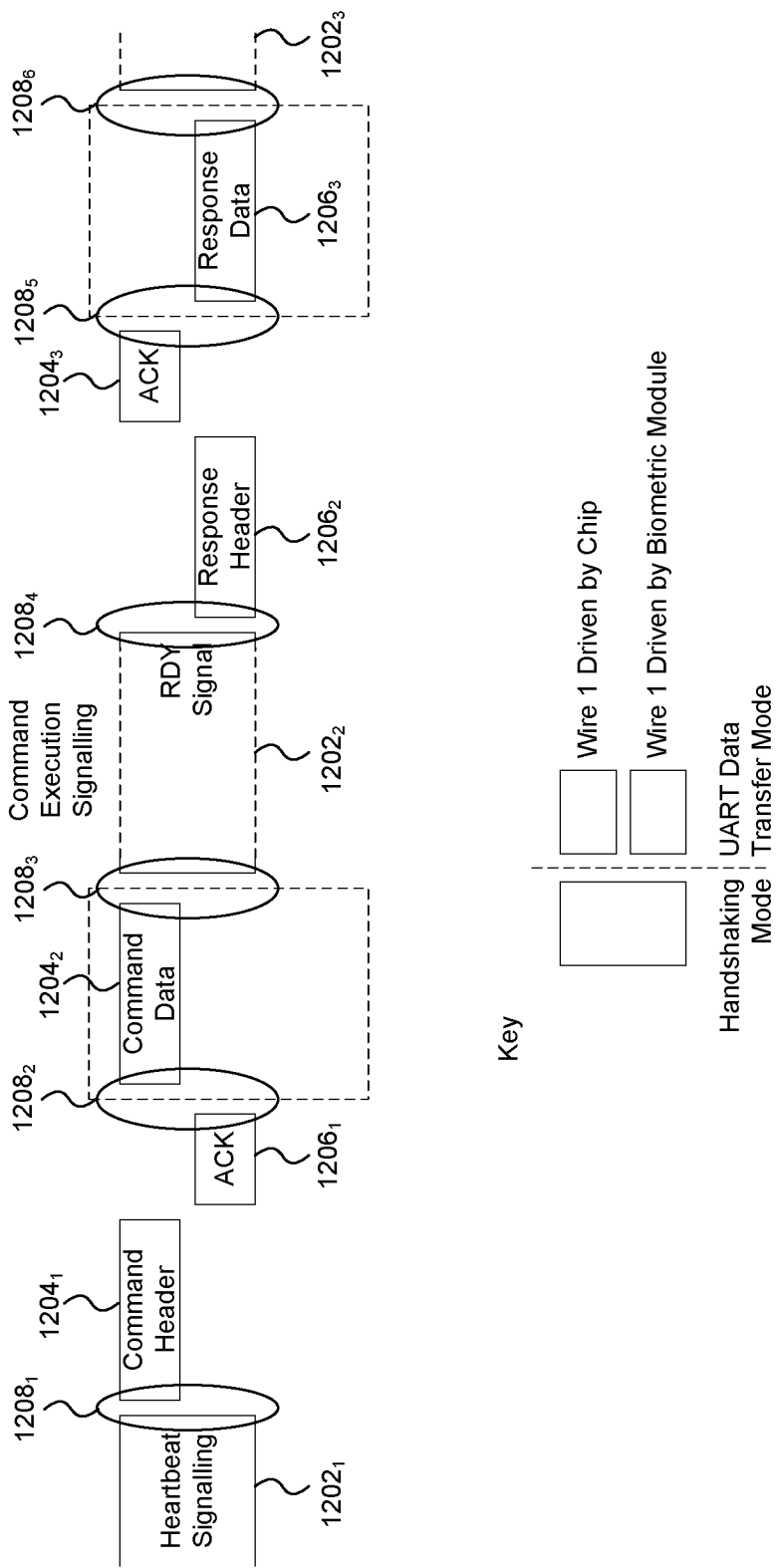
FIG. 12 is a schematic diagram illustrating a second example command-response sequence and a second example set of mode transitions.

In the example of FIG. 12 the interface 1000 starts in the handshaking mode $1202_1$ where the chip 106 and the biometric module 108 perform a heartbeat handshaking sequence. In some cases, the heartbeat handshaking sequence may be performed to notify the biometric module 108 that the chip 106 would like the biometric module 108 to do some work (e.g. perform an action or execute a command) and to confirm that the biometric module 108 is ready to execute the command. As described above, when the biometric module 108 is not executing a command-response sequence with the chip 106, the biometric module 108 may enter a low power mode. In these cases, the heartbeat handshaking sequence may cause the biometric module 108 to transition from the low power mode to a normal operating mode. Once the heartbeat handshaking sequence is complete, the interface 1000 is transitioned $1208_1$ to the data transfer mode $1204_1$ where the chip 106 transmits a command header to the biometric module 108. The command header may specify the command that is to be executed by the biometric module 108 (e.g. the action that is to be performed by the biometric module 108). For example, the command header may specify that the biometric module 108 is to perform biometric authentication of the user of the device 100.

Once the command header has been transmitted, instead of transitioning back to the handshaking mode as in FIG. 11, the interface 1000 remains in the data transfer mode $1206_1$ where the biometric module 108 transmits an acknowledgment of the command header. What happens next depends on whether there is command data to be sent from the chip 106 to the biometric module 108. If there is no command data, then the interface 1000 transitions $1208_2$ to the handshaking mode $1202_2$ where the chip 106 and the biometric module 108 perform a command execution handshaking sequence while the biometric module 108 executes the command. If however, there is command data to be sent then the interface 1000 remains in the data transfer mode $1204_2$ and the command data is transmitted from the chip 106 to the biometric module 108. Once the command data transmission is complete the interface 1000 is transitioned $1208_3$ to the handshaking mode $1202_2$ where the chip 106 and the biometric module 108 perform a command execution handshaking sequence while the biometric module 108 executes the command.

Once the biometric module 108 has completed execution of the command the biometric module 108 signals the completion by performing a ready handshaking sequence. The ready handshaking sequence triggers a transition $1208_4$ into the data transfer mode $1206_2$ where the biometric module 108 transmits the response header. Once the response header transmission is complete, instead of transitioning the interface 1000 back to the handshaking mode as in the example of FIG. 11, the interface 1000 remains in the data transfer mode $1204_3$ and the chip 106 transmits an acknowledgement of the response header. What happens next depends on whether there is response data to be sent from the biometric module 108 to the chip 106. If there is no response data, then the interface 1000 transitions $1208_5$ to the handshaking mode $1202_3$ where the chip 106 may initiate a heartbeat handshaking sequence to start a new command-response sequence. If however, there is response data to be sent then the interface 1000 remains in the data transfer mode $1206_3$ and the response data is transmitted from the biometric module 108 to the chip 106. Once the response data transmission is complete the interface 1000 is transitioned $1208_6$ to the handshaking mode $1202_3$ where the chip 106 may, for example, initiate a heartbeat handshaking sequence to start a new command-response sequence.

In some cases, as shown in FIGS. 11 and 12, a transition from operating the interface 1000 in the handshaking mode to operating the interface in data transfer mode may be triggered by the completion of a handshaking sequence (e.g. heartbeat handshaking sequence, ready handshaking sequence). In these cases, to ensure the chip 106 and the biometric module 108 have sufficient time to reconfigure themselves to operate the interface 1000 in the data transfer mode, the chip 106 and the biometric module 108 may be configured to operate the interface 1000 in the data transfer mode only after a handshake-to-data threshold amount of time has elapsed after the completion of the handshaking sequence. The handshake-to-data threshold may be determined empirically.

In some cases, as shown in FIG. 11, a transition from operating the interface 1000 in data transfer mode to operating the interface in handshaking mode may be triggered by the completion of a data transfer (e.g. the transmission of a command header, command data, acknowledgment, response header or response data). In these cases, to ensure the chip 106 and the biometric module 108 have sufficient time to reconfigure themselves to operate the interface 1000 in the handshaking mode, the chip 106 and the biometric module 108 may be configured to operate the interface 1000 in the handshaking mode only after a data-to-handshake threshold amount of time has elapsed after the completion of the data transfer. The data-to-handshake threshold may be determined empirically.

Example handshaking sequences and transitions between modes (including example timing thresholds thereof) will be described below with reference to FIGS. 13 to 17. In these examples, the chip 106 and the biometric module 108 are configured to operate in the interface 1000 in accordance with ISO 7816 UART when operating the interface 1000 in the data transfer mode. In this example, the UART is configured for 8 bit data, 1 stop bit, no parity (i.e. 10 bit-periods per byte). However, it will be evident to a person of skill in the art that this is an example only.

Figure 13:
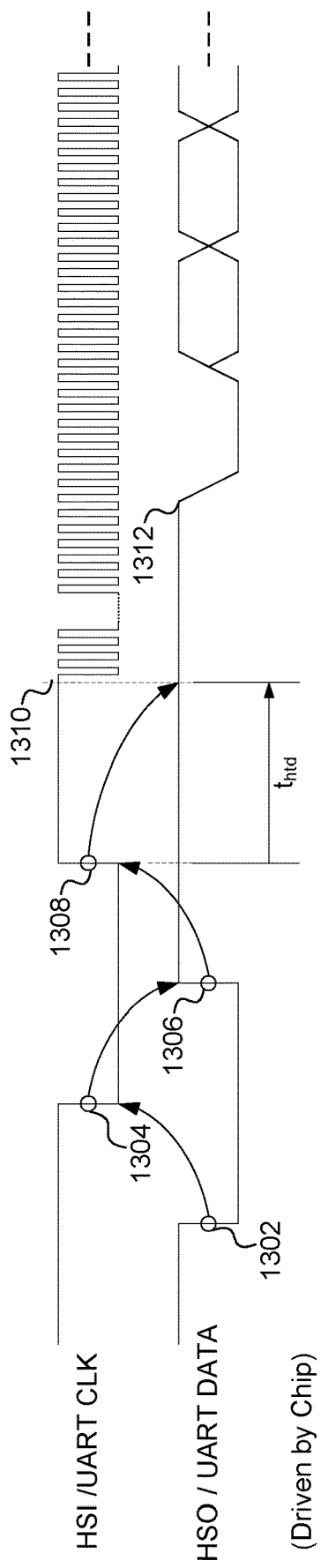
FIG. 13 is a timing diagram illustrating an example heartbeat handshaking sequence following by a transition to a data transfer mode in which the chip is transmitting data.

Reference is now made to FIG. 13 which illustrates an example heartbeat handshaking sequence followed by a transition into a data transfer mode in which the chip 106 transmits the command header. In this example, the interface 1000 begins in the handshaking mode and the chip 106 initiates the heartbeat handshaking sequence by sending a heartbeat signal on the first wire 1002 at 1302. In some cases, the chip 106 may send a heartbeat signal on the first wire 1002 by causing the first wire 1002 to transition from a first state to a second state. For example, as shown in FIG. 13 the chip 106 may send a heartbeat signal on the first wire 1002 by driving the first wire 1002 low (where the quiescent state is high). The heartbeat on the first wire 1002 is detected by the biometric module 108 (which may cause the biometric module 108 to transition from a low power mode to a normal operating mode) which causes the biometric module 108 to acknowledge the heartbeat on the second wire 1004 at 1304. In some cases, the biometric module 108 may acknowledge the heartbeat on the second wire 1004 by driving the second wire 1004 from a first state to a second state. For example, as shown in FIG. 13 the biometric module 108 may acknowledge the heartbeat by driving the second wire 1004 low (where the quiescent state is high).

In response to receiving the heartbeat acknowledgement the chip 106 removes the heartbeat on the first wire 1002 at 1306 but remains in the handshaking mode. In some cases, the chip 106 may remove the heartbeat on the first wire 1002 by driving the first wire 1002 from the second state to the first state. For example, as shown in FIG. 13 the chip 106 may remove the heartbeat on the first wire 1002 by driving the first wire 1002 high. (i.e. returning it to the quiescent state). In response to detecting the removal of the heartbeat the biometric module 108 sends a signal on the second wire 1004 indicating that it is ready to receive data at 1308. In some cases, the biometric module 108 may indicate that it is ready to receive data by driving the second wire 1004 from the second state back to the first state. For example, as shown in FIG. 13 the biometric module 108 may indicate that it is ready to receive data by driving the second wire 1004 high (i.e. returning it to the quiescent state). This may complete the heartbeat handshaking sequence which triggers a transition of the interface 1000 to the data transfer mode.

The chip 106 and the biometric module 108 may begin operating the interface 1000 in the data transfer mode after a handshake-to-data threshold ($t_{htd}$) amount of time has elapsed since the completion of the heartbeat handshaking sequence (i.e. at 1310). For example, after the handshake-to-data threshold amount of time has elapsed after the completion of the heartbeat handshaking sequence, the biometric module 108 may begin driving the second wire 1004 to provide a clock signal. The chip 106 may then wait for the clock to become stable (e.g. it may wait a certain number (e.g. 16) of cycles after the biometric module 108 begins driving the clock signal) before the chip 106 transmits data (e.g. the command header).

The handshake-to-data threshold may be selected so as to give the chip 106 and the biometric module 108 sufficient time to reconfigure themselves to operate the interface 1000 in the data transfer mode. In some cases the handshake-to-data threshold may be at least 20 µs. In some cases, the chip 106 and/or the biometric module 108 may have one module that operates or controls the interface 1000 in handshaking mode and a different module that operates or control the interface 1000 in data transfer mode. For example, the chip 106 or the biometric module 108 may comprise a UART module which operates the interface 1000 in the data transfer mode and a handshaking module which operates the interface 1000 in the handshaking mode. In these cases, the first and second wires of the interface 1000 may be directed to the appropriate module depending on the mode. This direction of the signals to the appropriate module may be performed in hardware or software.

Figure 14:
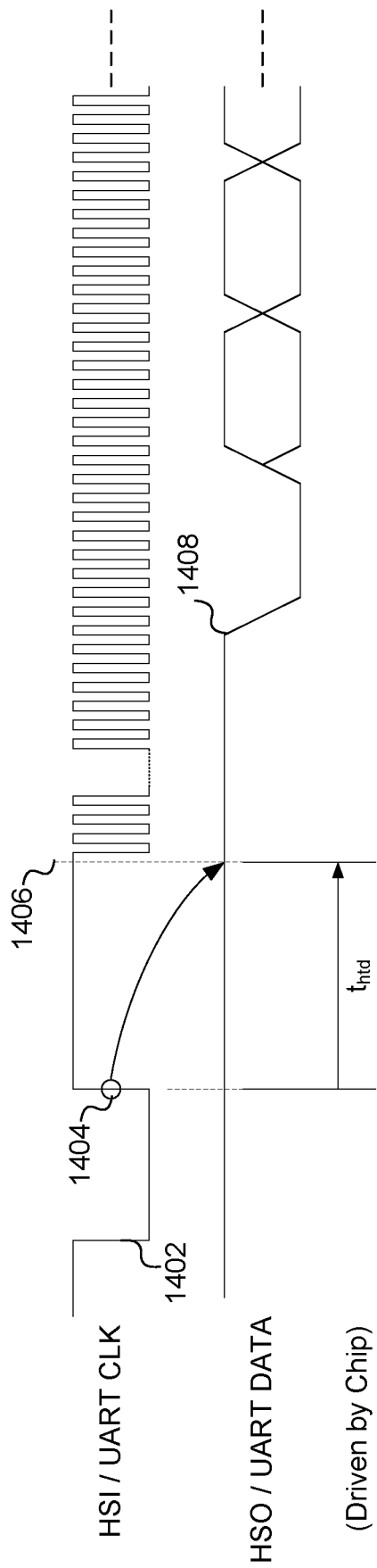
FIG. 14 is a timing diagram illustrating an example ready handshaking sequence followed by a transition to a data transfer mode in which the chip is transmitting data.

Reference is now made to FIG. 14 which illustrates an example ready handshaking sequence followed by a transition into a data transfer mode in which the chip 106 transmits data. This may be used to implement the ready handshaking sequence to command data transmission, or the ready handshaking sequence to response header acknowledgement transmission of FIG. 11. The ready handshaking sequence may be used to indicate that the biometric module 108 is ready to receive data. In this example the interface 1000 begins in handshaking mode and the biometric module 108 initiates the ready handshaking sequence by driving the second wire 1004 from a first state to a second state at 1402. For example, as shown in FIG. 14 the biometric module 108 may initiate the ready handshaking sequence by driving the second wire 1004 low. The biometric module 108 may then subsequently indicate the end of the ready handshaking sequence by driving the second wire 1004 from the second state back to the first state at 1404. For example, as shown in FIG. 14 the biometric module 108 may indicate the end of the ready handshaking sequence by driving the second wire 1004 high. The completion of the ready handshaking sequence triggers a transition of the interface 1000 to the data transfer mode.

Specifically, the chip 106 and the biometric module 108 may be configured to begin operating the interface 1000 in the data transfer mode after a handshake-to-data threshold ($t_{htd}$) amount of time has elapsed from the completion of the ready handshaking sequence (i.e. at 1406). For example, after the handshake-to-data threshold amount of time has elapsed from the completion of the ready handshaking sequence, the biometric module 108 may begin driving the second wire 1004 to provide a clock signal as per a UART data transfer. Then after waiting for the clock to become stable (e.g. after a predetermined number (e.g. 16) clock cycles) the chip 106 may begin its data transmission (at 1408). As described above, the handshake-to-data threshold may be selected so as to give the chip 106 and the biometric module 108 sufficient time to reconfigure themselves to operate the interface 1000 in the data transfer mode.

Figure 15:
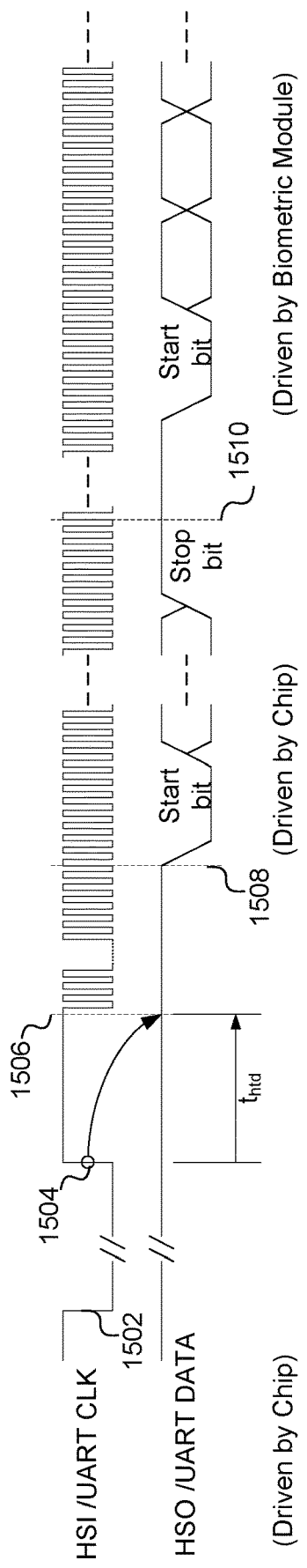
FIG. 15 is a timing diagram illustrating an example ready handshaking sequence followed by a transition to a data transfer mode in which the biometric module is transmitting data.

Reference is now made to FIG. 15 which illustrates an example ready handshaking sequence followed by a transition into a data transfer mode in which the biometric module 108 transmits data. This may be used to implement the ready handshaking sequence to command header acknowledgement transmission, the ready handshaking sequence to response header transmission, or the ready handshaking sequence to response data transmission of FIG. 11 or FIG. 12. The ready handshaking sequence may be used to indicate that the biometric module 108 is ready to transmit data. In this example the interface 1000 begins in handshaking mode and the biometric module 108 initiates the ready handshaking sequence by driving the second wire 1004 from a first state to a second state at 1502. For example, as shown in FIG. 15 the biometric module 108 may initiate the ready handshaking sequence by driving the second wire 1004 low. The biometric module 108 may then subsequently indicate the end of the ready handshaking sequence by driving the second wire 1004 from the second state back to the first state at 1504. For example, as shown in FIG. 15 the biometric module 108 may indicate the end of the ready handshaking sequence by driving the second wire 1004 high. The completion of the ready handshaking sequence triggers a transition of the interface 1000 to the data transfer mode.

Although the transition into data transfer mode is to allow the biometric module 108 to transmit data, in this example, the chip 106 and the biometric module 108 are configured to first operate the interface 1000 in a data transfer mode in which the chip is transmitting data (i.e. a data transfer mode in which the chip 106 is driving the first wire 1002) so that the chip 106 can send an acknowledgment of the data transmission request by the biometric module 108. Specifically, the completion of the ready handshaking sequence causes the biometric module 108 to transition the second wire 1004 to be the clock output for a data transfer (e.g. a UART clock); and cause the chip 106 to transition the first wire 1002 to be the data output (e.g. UART data out).

The chip 106 and the biometric module 108 are then configured to begin operating the interface 1000 in the data transfer mode after a handshake-to-data threshold ($t_{htd}$) amount of time has elapsed from the completion of the ready handshaking sequence (i.e. at 1506). Specifically, after the handshake-to-data threshold amount of time has elapsed from the completion of the ready handshaking sequence (i.e. at 1506) the biometric module 108 begins driving the second wire 1004 to provide a clock signal in accordance with a UART data transfer. Then after waiting for the clock to become stable (e.g. after a predetermined number (e.g. 16) clock cycles—i.e. at 1508) the chip 106 transmits an acknowledgement on the first wire 1002 to indicate to the biometric module 108 that it is ready to accept the data that the biometric module 108 is to send. In some cases the acknowledgement may be a single byte (e.g. 0x06 hexadecimal, or 0xf9 hexadecimal) or may be two bytes (e.g. 0x06 0x00 hexadecimal). This acknowledgement is not used in the interface 300 described above with respect to FIGS. 3 to 9 because in an SPI data transfer the master (e.g. chip 106) generates the clock signal and the master (e.g. chip 106) won't generate the clock signal unless it is ready to receive data. The transmission of the acknowledgment triggers a transition of the interface 1000 to a data transfer mode in which the biometric module 108 transmits data (i.e. the first wire 1002 is driven by the biometric module 108).

Specifically, once the acknowledgement has been transmitted (i.e. at 1510) the chip 106 transitions the first wire 1002 to a data transfer input (e.g. UART data input) and the biometric module 108 transitions the first wire 1002 to a data transfer output (e.g. a UART data output) and then the biometric module 108 transmits its data (e.g. command header acknowledgement, response header or response data).

Figure 16:
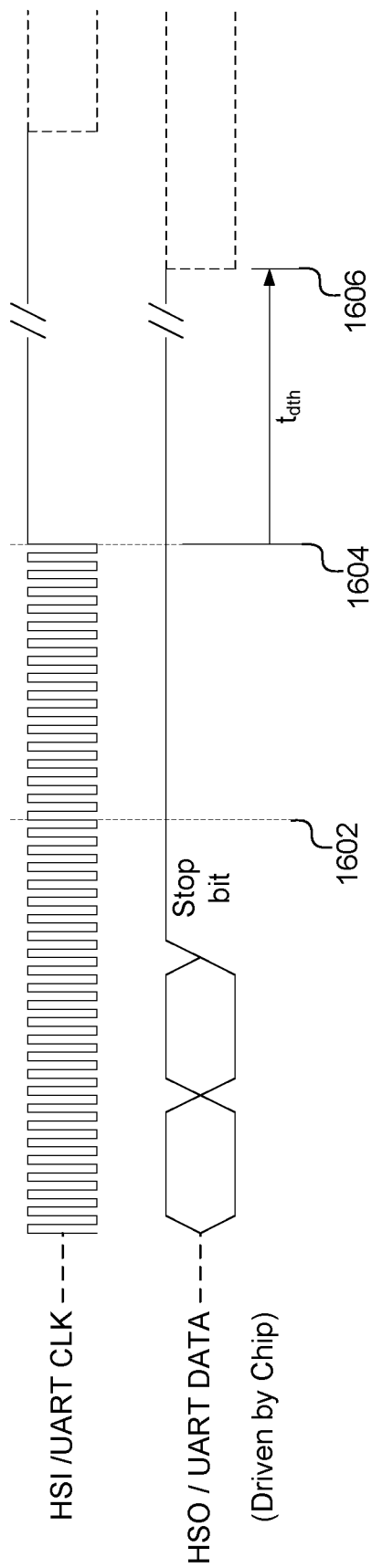
FIG. 16 is a timing diagram illustrating an example chip data transfer followed by a transition to the handshaking mode.

Reference is now made to FIG. 16 which illustrates an example chip 106 data transfer followed by a transition into the handshaking mode. This may be used to implement the command data transfer to ready handshaking sequence of FIG. 11; the command data transfer to command execution handshaking sequence of FIGS. 11 and 12; or the response header acknowledgment transfer to ready handshaking sequence of FIG. 11. In this example the interface 1000 begins in the data transfer mode in which the chip 106 transmits data (e.g. command header, command data, response header acknowledgement). The completion of the data transfer (e.g. indicated by the transmission of the stop bit of the last byte of the data transfer—at 1602) triggers a transition to the handshaking mode.

Specifically, subsequent to the completion of the data transfer (i.e. after the biometric module 108 detects the end of the data transmission at 1604) the chip 106 and the biometric module 108 begin transitioning the interface 1000 to the handshaking mode. For example, the chip 106 may configure the first wire 1002 to be a handshake output and the second wire 1004 to be a handshake input; and the biometric module 108 may configure the first wire 1002 to be a handshake input and the second wire 1004 to be a handshake output. Then after a data-to-handshake threshold ($t_{dth}$) amount of time has elapsed from when the chip 106 and the biometric module 108 began transitioning the interface 1000 to the handshaking mode (i.e. at 1606) the chip 106 and the biometric module 108 may begin operating the interface 1000 in the handshaking mode (e.g. either the chip 106 or the biometric module 108 may initiate a handshaking sequence.) For example, at 1606 the biometric module 108 may drive the second wire 1004 low to initiate a ready handshaking sequence or at 1606 the chip 106 may drive the first wire 1002 low to initiate a heartbeat handshaking sequence. The data-to-handshake threshold may be implemented to ensure that the chip 106 or the biometric module 108 do not initiate a handshaking sequence before the other device has time to reconfigure itself so that it can detect the start of a handshaking sequence (e.g. it is ready to detect a high-low transitions which may be referred to herein as a handshaking edge).

Figure 17:
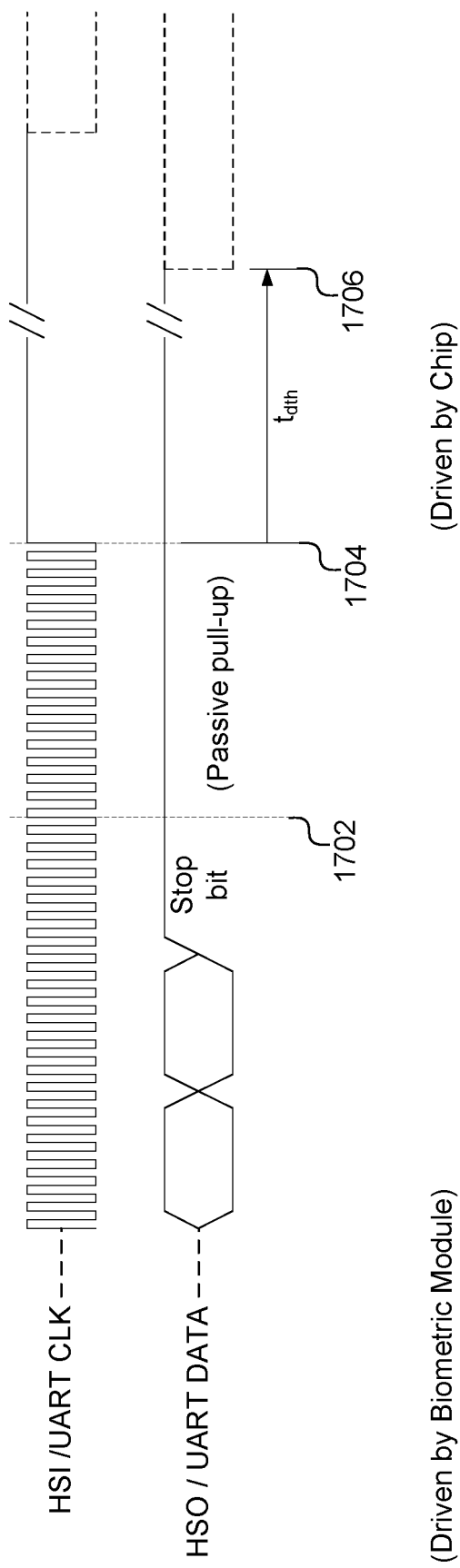
FIG. 17 is a timing diagram illustrating an example biometric module data transfer followed by a transition to the handshaking mode.

Reference is now made to FIG. 17 which illustrates an example biometric module 108 data transfer followed by a transition into the handshaking mode. This may be used to implement the command header acknowledgement transfer to ready handshaking sequence of FIG. 11; the response header transfer to ready handshaking sequence of FIG. 11; or the response data transfer to ready handshaking sequence of FIGS. 11 and 12. In this example the interface 1000 begins in the data transfer mode in which the biometric module 108 transmits data (e.g. command header acknowledgement, response header, response data). The completion of the data transfer (e.g. indicated by the transmission of the stop bit of the last byte of data—at 1702) triggers a transition to the handshaking mode.

Specifically, subsequent to the completion of the data transfer (i.e. after the chip 106 detects the end of the data transmission at 1704) the chip 106 and the biometric module 108 begin transitioning the interface 1000 in the handshaking mode. For example, the chip 106 configures the first wire 1002 to be a handshake output and the second wire 1004 to be a handshake input; and the biometric module 108 configures the first wire 1002 to be a handshake input and the second wire 1004 to be a handshake output. Then after a data-to-handshake threshold ($t_{dth}$) amount of time has elapsed from when the chip 106 and the biometric module 108 began transitioning the interface 1000 in the handshaking mode (i.e. at 1706) the chip 106 and the biometric module 108 may begin operating the interface 1000 in the handshaking mode (e.g. either the chip 106 or the biometric module 108 may initiate a handshaking sequence.) For example, at 1706 the biometric module 108 may drive the second wire 1004 low to initiate a ready handshaking sequence, or at 1706 the chip 106 may drive the first wire 1002 low to initiate a heartbeat handshaking sequence.

In both example interface implementations described above (e.g. the example implementation described with respect to FIGS. 3 to 9, and the example implementation described above with respect to FIGS. 10 to 17) the handshake out wire (e.g. the first wire 302 or 1002) may be driven to ca ertain state (e.g. high) during command execution and the handshake in wire (e.g. the second wire 304 or 1004) may be driven to a different state (e.g. low) during command execution.

In some cases, the chip 106 may be configured to communicate with the terminal 102 in accordance with a contactless transmission protocol when the device 100 is operating in contactless mode whereby a message, or command, sent by the terminal 102 sets a specified waiting time for response from the chip 106 to maintain a connection with the terminal. The contactless protocol may be specified by the ISO 14443 and/or EMVCo® standards, for example. The chip 106 can communicate requests to the terminal 102 that extend the waiting time for response, but each request is to be sent prior to the expiry of the existing waiting time, otherwise the terminal 102 assumes the connection to the chip has failed. Thus, the transmission protocol governing communications between the chip 106 and terminal 106 may set timing restrictions on those communications. In particular, the contactless protocol may be such that failure by the chip 106 to respond to the terminal 102 prior to the expiry of the specified waiting time (by communicating a waiting time extension request or some other message) causes the connection between the chip 106 and the terminal 102 to fail (e.g. time out).

Specifically, the ISO 14443 and EMVCo® standards specify that the terminal 102, having sent a command to the chip 106, sets an initial waiting time (known as the frame waiting time (FWT)) for a response from the chip 106. The FWT is the maximum amount of time permitted for the chip 106 to initiate sending a response back to the terminal 102. Failure by the chip 106 to send a response to the terminal within the FWT may result in the communication connection between the chip 106 and the terminal 102 being lost, for example timed out. The value of the FWT can be negotiated between the device 100 and the terminal 102. The waiting time extension request may be denoted S(WTX). In response to receiving the waiting time extension request, the terminal extends the waiting time for a response from the chip 106. The device 100 may extend the waiting time by the frame waiting time FWT (i.e., it may extend the waiting time by an amount equal to the initial waiting time). A waiting time extension request may be made at any time before the expiry of the current waiting time.

It is desirable for the biometric module 108 not to perform its functioning during the periods the chip 106 is communication with the terminal 102. This is for two main reasons. Firstly, when the device 100 is operating in contactless mode, the power that can be harvested from the wireless signal emitted from the terminal 102 may be limited and the power that is harvested may be prioritized to support the scheduled communications with the terminal 102 necessitated by the standards the device 100 is operating in compliance with. Secondly, power drawn by the biometric module 108 during periods the chip 106 is communicating with the terminal 102 affects the load modulation of the signal emitted by the terminal 102, which can appear as extra noise to the terminal 102. In other words, power drawn by the biometric module 108 may cause interference in the communications between the chip 106 and the terminal 102.

To avoid these problems, the command execution performed by the biometric module 108 may be partitioned into a plurality of discrete operations, or tasks. Each task may take a reduced amount of time to complete than the command execution of which it forms part. Processing performed by the biometric module 108 can be started or paused on the boundaries between discrete operations. In other words, processing performed by the biometric module 108 may be paused upon completion of a discrete task, and resumed by processing a subsequent discrete task. It is possible for the commands executed by the biometric module 108 to be partitioned into discrete tasks with varying degrees of granularity. For example, a discrete operation may refer to one of the biometric authentication steps described above (e.g. image acquisition by the sensor). Alternatively, a discrete operation may be a combination of biometric authentication steps. The device 100 then operates to synchronise the processing of these discrete operations with the scheduled communications between the device 100 and the terminal 102 (which in this example, are the waiting time extension requests S(WTX)). The device 100 performs this synchronization so that the discrete operations are performed within the waiting period.

Three approaches for performing the synchronisation are described in the Applicant's U.S. patent application Ser. No. 15/883,543, which is herein incorporated by reference in its entirety. It is submitted that any of the three described methods may be used to synchronize the command execution performed by the biometric module 108 and the communications between the chip 106 and the terminal 102 to ensure that the communications between the chip 106 and the terminal 102 do not timeout and/or are not compromised.

U.S. patent application Ser. No. 15/883,543 also describes example suspend and resume handshaking sequences which may be used to suspend, and subsequently resume, command execution by the biometric module 108 to allow the chip 108 to transmit a S(WTX) message to the terminal 102.

Although in the examples described above the interface between the chip and the biometric module is used solely for communications (e.g. biometric communications) between the chip and the biometric module, in other cases the interface between the chip and the biometric module may be used for multiple functions or purposes. In particular, in some cases the interface between the chip and the biometric module may be used for communications (e.g. biometric communications) between the chip and the biometric module, and for communications between the chip and another device, such as the terminal.

Figure 18:
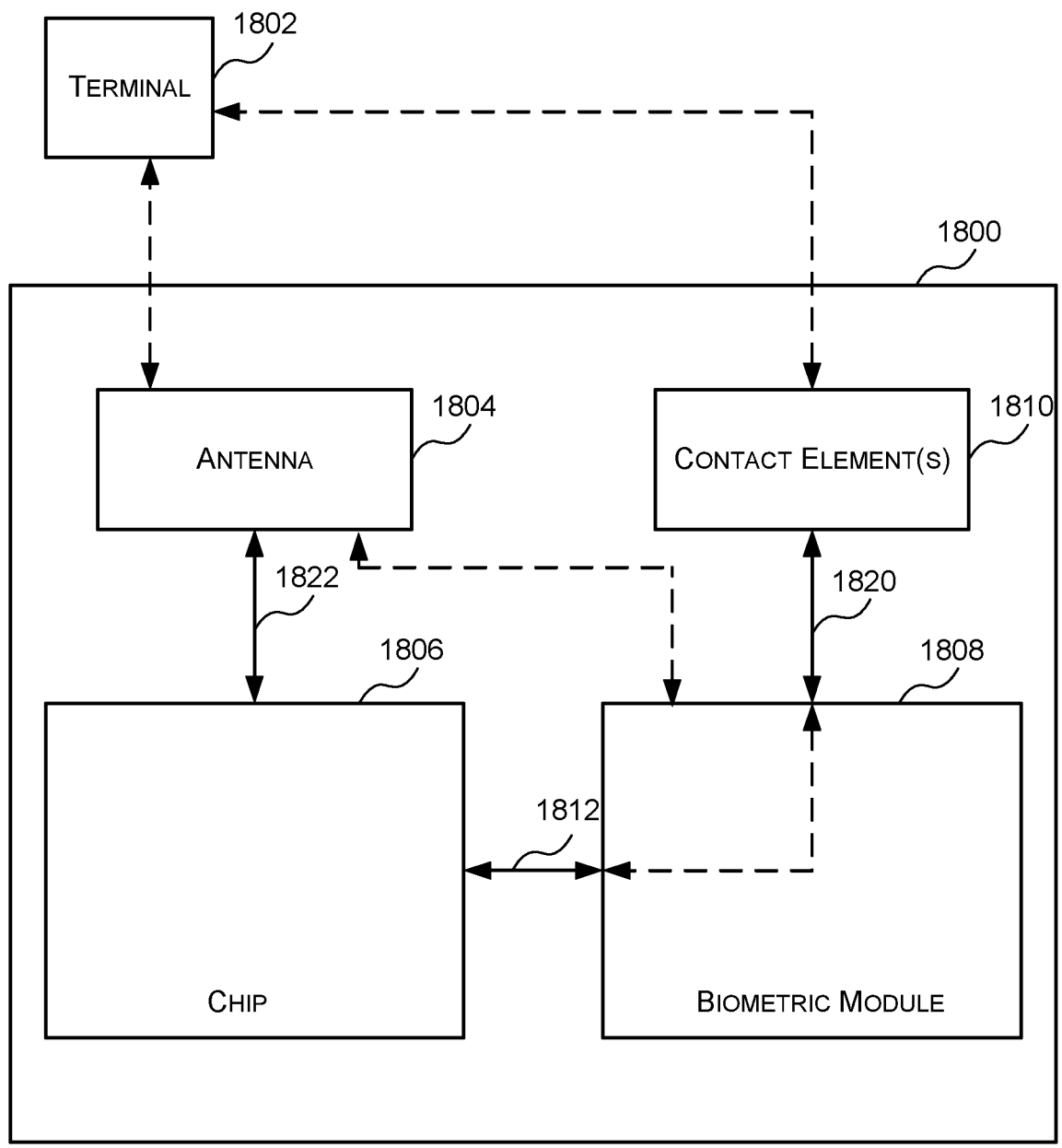
FIG. 18 is a block diagram of a second example device capable of contactless or contact communication with a terminal wherein the device comprises a chip and a biometric module connected by an interface.

For example, reference is now made to FIG. 18 which shows a second example device 1800 that is capable of contact or contactless communication with a terminal 1802. Like the device 100 of FIG. 1, the device 1800 of FIG. 18 comprises a chip 1806 and a biometric module 1808 and the chip 1806 can communicate with the terminal 1802 in contact mode via one or more contact element(s) 1810 or in contactless mode via an antenna 1804. However, in this example, instead of there being a dedicated interface (e.g. wires or conductors) between the chip 1806 and the contact element(s) 1810, the biometric module 1808 is connected to the contact element(s) 1810 via the biometric module 1808. Specifically, the biometric module 1808 is connected to the contact element(s) 1810 via a first interface 1820; and to the chip 1806 via a second interface 1812. When the device 1800 is operating in contact mode all communications between the chip 1806 and the terminal 1802 go through the biometric module 1808. When the device 1800 is operating in contact mode the chip 1806 may communicate with the terminal 1802 according to the ISO 7816 standard.

The device 1800 also comprises a third interface 1822 connecting the chip 1806 to the antenna 1804. When the device 1800 is operating in contactless mode the communications between the chip 1806 and the terminal 1802 are not routed via the biometric module 1808. When the device 1800 is operating in contactless mode the chip 1806 may communicate with the terminal 1802 according to the ISO 14443 standard.

An example biometric module wherein the communications between the chip 1806 and the terminal 1802 are routed via the biometric module 1808 when the device 1800 is operating in contact mode is described in the Applicant's co-pending UK patent application number 1814210.9, which is herein incorporated by reference in its entirety. As described therein the biometric module 1808 may comprise a multiplexer (MUX) which receives signal inputs from the biometric module itself (e.g. a biometric controller thereof)

and from the contact element(s) 1810 via the first interface 1820 and multiplexes these received inputs onto the second interface 1812 for reception by the chip 1806. The MUX also receives inputs from the chip 1806 via interface 1812 which it directs to the biometric module (e.g. a biometric controller thereof) or the contact element(s) 1810 via interface 1820 as appropriate.

For example, the first and second interfaces 1820 and 1812 may each have at least two wires—a wire for carrying a clock signal (which may be referred to herein as the clock wire) and a wire for transmitting data (which may be referred to herein as the data wire)—and the biometric module may comprise corresponding ports—a clock port and a data port. The MUX may be configured to connect the clock wire of the second interface 1812 to the clock wire of the first interface 1820 or to the clock port of the biometric module; and the data wire of the second interface 1812 to the data wire of the first interface 1820 or to the data port of the biometric module.

In some cases, the second interface 1812 may be implemented using the interface 1000 described above with respect to FIGS. 10 to 17. In particular, when the device 1800 is operating in contactless mode, and the interface 1812 (e.g. interface 1000) is used exclusively for communications (e.g. biometric communications) between the chip 1806 and the biometric module 1808, the chip 1806 and the biometric module 1808 may operate the interface 1812 as described above with respect to FIGS. 10 to 17—i.e. in a handshaking mode and the data transfer mode.

However, to accommodate the use of the interface 1812 for communications between the chip 1806 and the terminal 1802 via the contact elements(s) 1810 the interface 1812 (e.g. interface 1000) may be further operable in an external communication mode in which the chip 1806 is communicating with the terminal 1802 via the contact element(s) 1810. Then when the device 1800 is operating in contact mode the interface 1812 may be operable between the external communication mode, and the data transfer mode described above. Accordingly, when the device 1800 is operating in contact mode the interface 1812 may not be operable in the handshaking mode. When the interface 1000 is operating in the UART data transfer mode, some of the UART parameters may be chosen to be different to those used in the external communication mode. The parameters that differ between modes may include, but are not limited to, the number of data bits in the packet, whether a parity bit is generated and/or checked, the number of stop bits, and/or the frequency relationship between the clock signal (UART CLK) on the second wire 1004 and the baud rate.

When the device 1800 is operating in contact mode the interface 1812 may initially be used for communication between the chip 1806 and the terminal 1802 (i.e. the interface 1812 may initially be operated in the external communication mode). While the interface 1812 is being used for communication between the chip 1806 and the terminal 1802 (i.e. when the interface is being operated in the external communication mode) the biometric module 1808 may be configured to, in addition to routing the communications from the chip 1806 to the contact element(s) 1810 and vice versa, monitor the wire of the interface 1812 used for data transmission or transfer (e.g. the first wire 1002) for a special command or pattern which indicates the chip 1806 wants to transition the interface 1812 into the data transfer mode. The chip 1806 may, for example, want to transition the interface 1812 into the data transfer mode to issue a command to the biometric module 1808 to perform biometric authentication of the user of the device 1800. Since the chip 1806 will be connected to the terminal 1802 (via interfaces 1812 and 1820) when any such command or pattern is transmitted, the command or pattern is preferably selected so that the command or pattern will not cause the terminal 1802 to detect a problem or to behave in an erroneous manner. In other words, it may be advantageous to select a command or pattern that indicates or signals a transition to the data transfer mode that is benign in the communication protocol used between the chip 1806 and the terminal 1802.

Figure 19:
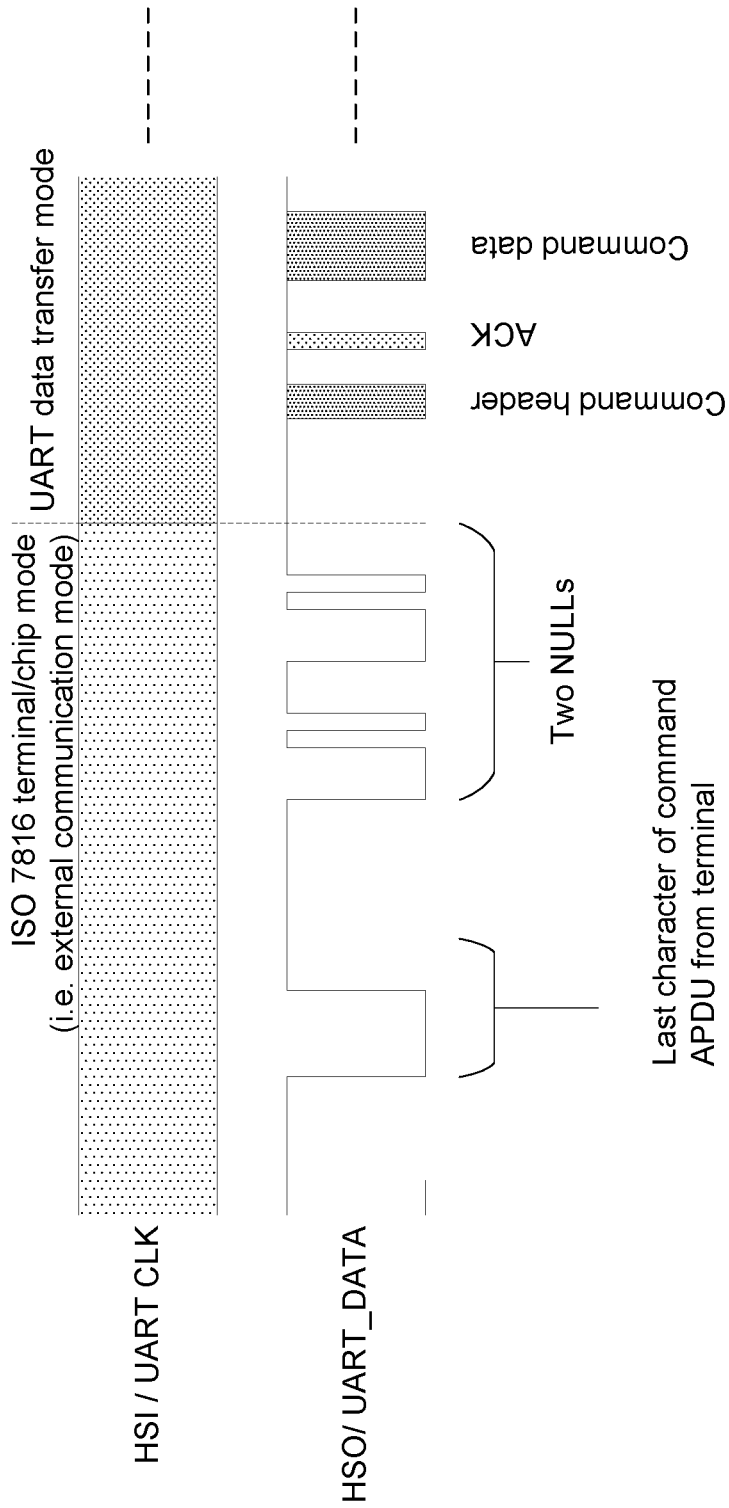
FIG. 19 is a timing diagram illustrating a first example command for triggering a transition from the external communication mode to the data transfer mode.

Reference is now made to FIG. 19 which illustrates a first example command or pattern which may be transmitted by the chip 1806 to indicate that the interface 1812 between the chip 1806 and the terminal 1802 is to be transitioned from the external communication mode to the data transfer mode when the chip 1806 and the terminal 1802 are configured to communicate in accordance with ISO 7816 T=0. As is known to those of skill in the art, the ISO 7816 requires data to be carried in Application Protocol Data Units (APDU). In this example, the chip 1806 may be configured to indicate that the interface 1812 (e.g. interface 1000) is to be transitioned from the external communication mode to the data transfer mode by sending, after the last character of a command APDU, two NULL (0×60 hexadecimal) procedure bytes within a short time of each other (e.g. the second NULL arrives within 10 ms of the first NULL arriving). Two NULL procedure bytes are syntactically legal in ISO 7816 T=0, but unusual since the NULL procedure byte is a "keep-alive" response intended to satisfy a waiting time when the chip 1806 needs more time before it responds to a command from the terminal 1802. As a result, such a command or pattern will not cause the terminal 1802 to detect there is a problem with the connection and/or communication with the chip 1806.

Figure 20:
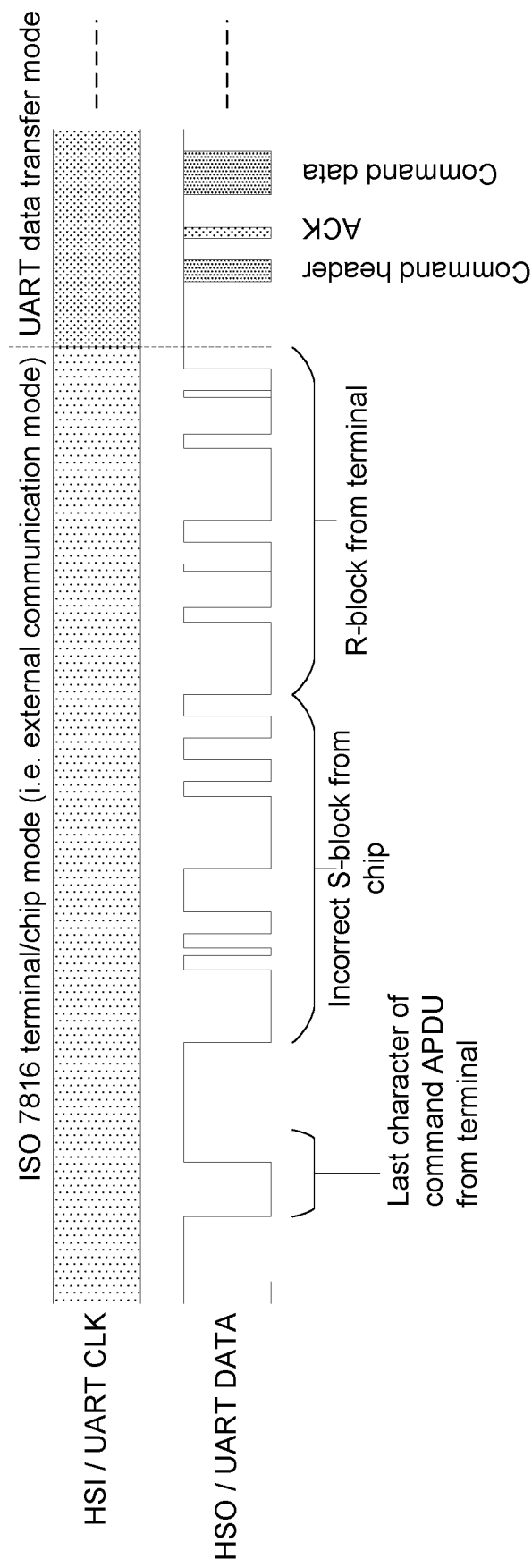
FIG. 20 is a timing diagram illustrating a second example command for triggering a transition from the external communication mode to the data transfer mode.

Reference is now made to FIG. 20 which illustrates a second example pattern or command which may be transmitted by the chip 1806 to indicate that the interface 1812 between the chip 1806 and the biometric module 1808 is to be transitioned from the external communication mode to the data transfer mode when the chip 1806 and the terminal 1802 are configured to communicate in accordance with ISO 7816 T=1. ISO 7816 T=1 does not use NULL procedure bytes for waiting time extension, so in this example, the chip 1806 may be configured to indicate that the interface 1812 (e.g. 1000) is to be transitioned from the external communication mode to the data transfer mode by sending, sometime after the last character of a command APDU, a badly formed (or incorrectly formed) S-block. An example of such a badly formed S-block is "00 E3 00 1C" hexadecimal. This S-block is badly formed for multiple reasons. It is a S(WTX response) block—a waiting time extension response (rather than a request) which is not normally sent by the chip 1806 (it is normally sent by the terminal 1802). The length field is incorrect for a block of this type and the LRC is incorrect (it is the bitwise complement of the expected value). The terminal 1802 should respond to such a badly formed S-block with a correctly formed R-block. Accordingly, in this example the biometric module 1808 may determine that the interface 1812 (e.g. 1000) is to be transitioned from the external communication mode to the data transfer mode when the biometric module 1808 detects this specific badly-formed S-block on the first wire 1002 followed by an R-block response from the terminal 1802.

When the biometric module 1808 detects the specific command or pattern on the data wire (e.g. the first wire 1002) indicating that the interface 1812 (e.g. interface 1000) is to be transitioned from the external communication mode to the data transfer mode the biometric module 1808 may be configured to electrically isolate the contact element(s) 1810 from biometric communications between the chip 1806 and the biometric module 1808 so as to establish a private channel between the chip 1806 and the biometric module 1808. For example, the wire of the interface 1820 connecting the biometric module 1808 to the contact element(s) 1810 which is coupled to the first wire 1002 of the interface 1812 (e.g. interface 1000) between the chip 1806 and the biometric module 1808 may comprise an isolator for isolating the contact element(s) 1810 from the biometric communications on the interface 1812 (e.g. interface 1000) between the chip 1806 and the biometric module 1808. The isolator may be a one-way isolator in that it might prevent data on the interface 1812 between the chip 1806 and the biometric module 1808 from being propagated to the interface 1820 between the biometric module 1808 and the contact element(s) 1810, while still allowing data arriving on the interface 1820 from the contact element(s) 1810 to be propagated to interface 1812. The isolator may be a pass transistor. The pass transistor may be a Field Effect Transistor (FET). Once the contact element(s) 1810, and thus the terminal 1802, is isolated from biometric communications between the chip 1806 and the biometric module 1808 the biometric communications do not need to use the same communications protocol or parameters as agreed between the chip 1806 and the terminal 1802.

In some cases, in addition to electrically isolating the contact element(s) 1810 from the biometric communications between the chip 1806 and the biometric module 1808 in response to detecting that the specific command or pattern on the data wire (e.g. the first wire 1002) indicating that the interface 1812 (e.g. interface 1000) between the chip 1806 and the biometric module 1808 is to be transitioned from the external communication mode to the data transfer mode, the biometric module 1808 may be configured to switch the clock source to an internally generated clock. For example, when the device 1800 is operating in contact mode the biometric module 1808 will receive a clock signal generated by the terminal 1802 from the contact element(s) via interface 1820 and the biometric module 1808 provides that clock signal (or a version therof) to the chip 1806 via interface 1812. When, however, the interface 1812 (e.g. interface 1000) is transitioned to operate in the data transfer mode the biometric module 1808 may be configured to instead of providing the clock signal generated by the terminal 1802 to the chip 1806 via interface 1812, providing an internally generated clock signal to the chip 1806. This may allow a higher baud rate to be used for biometric communications between the chip 1806 and the biometric module 1808 than was used for communications between the chip 1806 and the terminal 1802. Specifically, since the relatively short data wire (e.g. the first wire 1002) between the chip 1806 and the biometric module 1808 is decoupled from the larger data wire/line to the terminal 1802 the biometric communications may be implemented with a higher data rate than expected by the ISO 7816 standard.

Once the biometric module 1808 has transitioned the interface 1812 (e.g. interface 1000) to the data transfer mode and the chip 1806 and the biometric module 1808 have reconfigured themselves to use the parameters of the private channel, the chip 1806 can initiate a command-response sequence with the biometric module 1808 by transmitting a command to the biometric module 1808 on the first wire 1002 of the interface 1812 (e.g. interface 1000).

Where the biometric module 1808 is configured to switch the clock transmitted on the interface 1812 between the chip 1806 and the biometric module 1808 to the internal clock of the biometric module 1808, when the interface 1812 (e.g. interface 1000) is operating in data transfer mode then the once the interface 1812 (e.g. interface 1000) has been transitioned to data transfer mode the biometric module 1808 may be configured to send a calibration value to the chip 1806. The calibration value provides an indication of the relationship between the frequency of the clock signal generated by the terminal 1802 and the frequency of the internal clock signal. In some cases, the calibration value may be generated in accordance with equation (1) where $f_{terminal}$ is the frequency of the incoming clock signal from the contact element(s) 1810 received via interface 1820 and $f_{biometric}$ is the frequency of the clock signal generated by the internal clock of the biometric module 1808.

$$\text{calibration value} = \left[\frac{8192 \cdot f_{terminal}}{f_{biometric}}\right] \quad (1)$$

The calibration value may be conveyed as a 16-bit unsigned quantity. The use of 8192 may allow some headroom so that a lower $f_{biometric}$ may be used in some cases (e.g. for testing, debugging etc.). In these cases, the chip 1806 may be configured to scale its waiting time timeout by (8192/calibration value) in response to receiving a clock calibration value from the biometric module 1808, and may be configured to scale its waiting time timeout by (calibration value/8192) when the interface 1812 (e.g. interface 1000) is transitioned back to the external communication mode.

An example format for a packet used to convey the clock calibration value is shown in Table 1.

TABLE 1

| Section | Field | Size | Value |
|---|---|---|---|
| header | wSize | 2 | 6 |
|  | wCalibration | 2 | Calibration value |
|  | CRCHdr | 2 |  |

When the device 1800 is operating in contact mode and the interface 1812 is operating in data transfer mode, the biometric module 1808 may be configured to transition the interface 1812 back to the external communication mode when it detects a specific pattern on the wire used to transmit data (e.g. the first wire 1002). For example, in some cases the specific pattern may be a header (e.g. six bytes) with all zeros as shown in Table 2. This can be used to indicate that the interface 1812 (e.g. interface 1000) is to be transitioned to the external communication mode because a valid header cannot be all zero.

TABLE 2

| Section | Field | Size | Value |
|---|---|---|---|
| header | wSize | 2 | 0x0000 |
|  | wCode | 2 | 0x0000 |
|  | CRCHdr | 2 | 0x0000 |

Transitioning the interface 1812 (e.g. interface 1000) back to the external communication mode may comprise re-connecting the data wire of the interface 1820 between the biometric module 1808 and the contact element(s) 1810 to the data wire of the interface 1812 between the biometric module 1808 and the chip 1806. Where the clock signal used in the data transfer mode is a clock signal generated from a clock internal to the biometric module 1808, transitioning the interface 1812 back to the external communication mode may further comprise re-connecting the clock wire of the interface 1820 between the biometric module 1808 and the contact element(s) 1810 to the clock wire of the interface 1812 between the biometric module 1808 and the chip 1806.

The biometric module 1808 may be configured to determine whether the device 1800 is communicating with the terminal in a contact mode or a contactless mode by assessing whether there is power on the interface 1820 between the biometric module 1808 and the contact element(s) 1810. If the biometric module 1808 detects power on the interface 1820 then the biometric module 1808 may determine that the device 1800 is operating in the contact mode. The biometric module 1808 may alternatively, or additionally, be configured to determine whether the device 1800 is communicating with the terminal 1802 in a contact mode or a contactless mode by assessing whether there is an active clock on the clock line of the interface 1820 between the contact element(s) 1810 and the biometric module 1808. If the biometric module 1808 detects the presence of a clock on the clock line, then it determines that the device 1800 is operating in the contact mode. If the biometric module 1808 detects that there is no clock on the clock line, then it determines that the device 1800 is operating in the contactless mode.

In the example of FIG. 18, both the biometric module 1808 and the chip 1806 are powered by the terminal 1802. Specifically, in contactless mode the biometric module 1808 and the chip 1806 receive power from the wireless signal received from the terminal 1802 via the antenna 1804, and in contact mode the biometric module 1808 and the chip 1806 receive power from the terminal 1802 via the contact element(s) 1810. In some cases, the biometric module 1808 and the chip 1806 may each comprise a power harvesting unit, which operates as described above with respect to FIGS. 1 and 2 to harvest power from the RF field at the antenna 1804, so that when the device 1800 is operating in contactless mode the biometric module 1808 and the chip 1806 can harvest power from the RF field independently of one another. However, in some cases, when the device 1800 is operating in the contact mode the power management unit of the biometric module 1808 may receive power from the contact elements via power lines of the first interface 1820 and the power management unit of the biometric module 1808 may output the power to both the biometric module 1808 (e.g. the biometric control unit thereof) and the chip 106. Accordingly, in these cases, when the device 1800 is operating in the contact mode the power received via the contact element(s) 1810 may be provided to the chip 1806 via the biometric module 1808. It will be evident to a person of skill in the art that this is an example only and that in other cases only one of the biometric module 1808 and the chip 1806 may comprise a power harvester and the power harvested from the power harvester when the device 1800 is operating in contactless mode is distributed to the other device via the device with the power harvester; and/or both the biometric module 1808 and the chip may each receive power from the contact element(s) directly when the device 1800 is operating in contact mode.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A system comprising:
   a first device;
   a second device; and
   a two-wire interface configured to connect the first device to the second device;
   wherein the interface is configurable in a handshaking mode and a data transfer mode, such that, in the handshaking mode a first wire of the interface is driven by the first device and a second wire of the interface is driven by the second device, and in the data transfer mode one of the first wire and the second wire is driven by one of the first device and the second device to provide a clock signal and the other wire is driven by either the first device or the second device to transmit data depending on which of the first device and the second device is transmitting data, wherein when the first and second devices are operating the interface in handshaking mode the first device is configured to initiate a command-response sequence by initiating a first handshaking sequence on the first wire, and upon completion of the first handshaking sequence, the first and second devices are configured to transition to operating the interface in the data transfer mode wherein the first device drives the second wire, wherein the first handshaking sequence comprises:
   the first device configured to drive a state of the first wire from a first state to a second state;
   the second device, in response to detecting that the first wire is in the second state, configured to drive the second wire from the first state to the second state;
   the first device, in response to detecting that the second wire is in the second state, configured to drive the first wire from the second state to the first state; and
   the second device, in response to detecting that the first wire is in the first state, configured to drive the second wire from the second state to the first state.

2. The system of claim 1, wherein the second device is configured to operate in a low power mode and a normal operating mode and initiating the first handshaking sequence causes the second device to transition from the low power mode to the normal operating mode.

3. The system of claim 1, wherein the first and second devices are configured to, after each data transfer, transition from operating the interface in data transfer mode to operating the interface in handshaking mode.

4. The system of claim 1, wherein when the interface is operating in data transfer mode the first wire is driven by the first device to provide the clock signal.

5. The system of claim 1, where when the interface is operating in data transfer mode, the first device and the second device are configured to perform an SPI data transfer.

6. The system of claim 1, wherein the first device is a master device and the second device is a slave device.

7. The system of claim 1, wherein when the interface is operating in data transfer mode, the second wire is driven by the second device to provide the clock signal.

8. The system of claim 1, wherein when the interface is operating in data transfer mode the first device and the second device are configured to perform a UART data transfer.

9. The system of claim 1, wherein:
the interface is further operable in an external communication mode in which the first device uses the interface to communicate with another device; and
the system is operable in a first mode and a second mode and when the system is operating in the first mode, the interface is operable in the external communication mode and the data transfer mode and when the system is operating in the second mode, the interface is operable in the handshaking mode and the data transfer mode.

10. The system of claim 9, wherein when the interface is operating in the external communication mode the first device is configured to communicate with the other device in accordance with ISO 7816.

11. The system of claim 9, wherein when the system is operating in the first mode and the interface is operating in the external communication mode, the second device is configured to monitor the wire used to transmit data for a predetermined data pattern, and in response to detecting the predetermined data pattern, transition from operating the interface in the external communication mode to operating the interface in the data transfer mode.

12. The system of claim 11, wherein when the interface is operating in the external communication mode the first device communicates with the other device using a communication protocol and the predetermined data pattern is benign in the communication protocol.

13. The system of claim 12, wherein the communication protocol is ISO 7816 T=0 and the predetermined data pattern comprises two NULL procedure bytes within a predetermined time of each other.

14. The system of claim 12, wherein the communication protocol is ISO 7816 T=1 and the predetermined data pattern is a badly formed S-block to which the other device is configured to respond with an R-block.

15. The system of claim 11, wherein the second device is configured to transition the interface from operating in the external communication mode to operating in the data transfer mode by isolating the other device from the wire of interface used to transmit data to establish a private channel between the first device and the second device.

16. The system of claim 15, wherein when the interface is operating in the external communication mode the wire used for the clock signal is driven with a clock signal generated from an external clock, and the second device is further configured to transition the interface from operating in the external communication mode to operating in the data transfer mode by driving the wire used for the clock signal with a clock signal generated from an internal clock.

17. The system of claim 16, wherein subsequent to the private channel being established, the second device is configured to notify the first device of a frequency of the clock signal generated from the internal clock.

18. The system of claim 9, wherein when the system is operating in the second mode and the interface is operating in the data transfer mode, the second device is configured to, in response to detecting a specific pattern on the wire used to transmit data, transition the interface to operating in the external communication mode.

19. The system of claim 18, wherein the second device is configured to transition the interface from operating in the external communication mode to operating in the data transfer mode by isolating the other device from the wire of interface used to transmit data to establish a private channel between the first device and the second device and wherein the second device is configured to transition the interface to operating in the external communication mode by re-connecting the other device to the wire of the interface used to transmit data.

20. The system of claim 19, wherein subsequent to the private channel being established, the second device is configured to notify the first device of a frequency of the clock signal generated from the internal clock and wherein the second device is configured to transition the interface to operating in the external communication mode by driving the wire used for the clock signal with the clock signal generated from the external clock.

21. The system of claim 19, wherein when the interface is operating in the external communication mode the wire used for the clock signal is driven with a clock signal generated from an external clock, and the second device is further configured to transition the interface from operating in the external communication mode to operating in the data transfer mode by driving the wire used for the clock signal with a clock signal generated from an internal clock and wherein the second device is configured to transition the interface to operating in the external communication mode by driving the wire used for the clock signal with the clock signal generated from the external clock.

22. The system of claim 19, wherein subsequent to the private channel being established, the second device is configured to notify the first device of a frequency of the clock signal generated from the internal clock and wherein the second device is configured to transition the interface to operating in the external communication mode by driving the wire used for the clock signal with the clock signal generated from the external clock.

23. The system of claim 18, wherein when the interface is operating in the external communication mode the wire used for the clock signal is driven with a clock signal generated from an external clock, and the second device is further configured to transition the interface from operating in the external communication mode to operating in the data transfer mode by driving the wire used for the clock signal with a clock signal generated from an internal clock and wherein the second device is configured to transition the interface to operating in the external communication mode by driving the wire used for the clock signal with the clock signal generated from the external clock.

24. The system of claim 9, wherein when the system is operating in the first mode the first device is in contactless communication with the other device and when the system is operating in the second mode the first device is in contact communication with the other device.

25. The system of claim 1, wherein the first device is a chip configured to communicate with a terminal.

26. The system of claim 25, wherein the chip is a secure element.

27. The system of claim 1, wherein the second device is a biometric module comprising a biometric sensor for sensing biometric data.

* * * * *